US009830947B2

(12) United States Patent
Mukai et al.

(10) Patent No.: US 9,830,947 B2
(45) Date of Patent: Nov. 28, 2017

(54) IMAGE-CAPTURING DEVICE

(71) Applicant: Panasonic Intellectual Property Management Co., Ltd., Osaka (JP)

(72) Inventors: Tsutomu Mukai, Osaka (JP); Ryo Hirota, Osaka (JP); Yoshinori Okazaki, Osaka (JP); Akio Nishiyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/218,188

(22) Filed: Jul. 25, 2016

(65) Prior Publication Data

US 2016/0336041 A1 Nov. 17, 2016

Related U.S. Application Data

(63) Continuation of application No. PCT/JP2015/003352, filed on Jul. 3, 2015.

(30) Foreign Application Priority Data

Jul. 4, 2014 (JP) .................................. 2014-138954

(51) Int. Cl.
*H04N 9/80* (2006.01)
*H04N 5/77* (2006.01)
(Continued)

(52) U.S. Cl.
CPC .......... *G11B 27/031* (2013.01); *H04N 5/232* (2013.01); *H04N 5/2628* (2013.01); *H04N 5/77* (2013.01); *H04N 5/772* (2013.01); *H04N 5/907* (2013.01)

(58) Field of Classification Search
CPC ........ H04N 5/232; H04N 5/77; H04N 5/2628; H04N 5/772; H04N 5/907; G11B 27/031
(Continued)

(56) References Cited

U.S. PATENT DOCUMENTS

2003/0044083 A1* 3/2003 Mekata ..................... G06T 7/70
382/282
2004/0148640 A1* 7/2004 Masukura ................ H04N 7/16
725/135
(Continued)

FOREIGN PATENT DOCUMENTS

JP 2001-169172 6/2001
JP 2005-115598 4/2005
(Continued)

OTHER PUBLICATIONS

International Search Report of PCT application No. PCT/JP2015/003352 dated Oct. 6, 2015.
(Continued)

*Primary Examiner* — Robert Chevalier
(74) *Attorney, Agent, or Firm* — Renner Otto Boisselle & Sklar

(57) ABSTRACT

An image-capturing device according to the present disclosure includes: an image-capturing unit that captures a moving image and generates first moving image data; and a controller that generates second moving image data based on a cutout area obtained by cutting out a part of an entire area of a moving image indicated by the first moving image data and records the generated second moving image data on a recording medium. The controller changes at least one of a position and a size of the cutout area according to a predetermined instruction of a user and records resultant image data on the recording medium.

19 Claims, 20 Drawing Sheets

(51) Int. Cl.
  *G11B 27/031* (2006.01)
  *H04N 5/232* (2006.01)
  *H04N 5/262* (2006.01)
  *H04N 5/907* (2006.01)

(58) Field of Classification Search
  USPC ....... 386/248, 224, 223, 230, 239, 278, 280, 386/326
  See application file for complete search history.

(56) References Cited

U.S. PATENT DOCUMENTS

| | | | |
|---|---|---|---|
| 2006/0115235 | A1 | 6/2006 | Takikawa et al. |
| 2007/0018069 | A1 | 1/2007 | Higashino |
| 2011/0090246 | A1 | 4/2011 | Matsunaga |
| 2012/0033958 | A1 | 2/2012 | Ishida |
| 2012/0243738 | A1 | 9/2012 | Sakata |
| 2013/0108175 | A1 | 5/2013 | Ptucha |
| 2013/0265467 | A1 | 10/2013 | Matsuzawa et al. |
| 2014/0105460 | A1 | 4/2014 | Sakata |
| 2015/0049217 | A1 * | 2/2015 | Takahashi ............ H04N 5/2621 348/231.99 |

FOREIGN PATENT DOCUMENTS

| | | |
|---|---|---|
| JP | 2005-260737 | 9/2005 |
| JP | 2006-109119 | 4/2006 |
| JP | 2006-279894 | 10/2006 |
| JP | 2007-019685 | 1/2007 |
| JP | 2007-074503 A | 3/2007 |
| JP | 2007-299339 | 11/2007 |
| JP | 2008-022306 | 1/2008 |
| JP | 2008-135937 A | 6/2008 |
| JP | 2009-060291 | 3/2009 |
| JP | 2011-091571 | 5/2011 |
| JP | 2012-054920 | 3/2012 |
| JP | 2012-205037 | 10/2012 |
| JP | 2012-222387 | 11/2012 |
| JP | 2013-219556 | 10/2013 |
| WO | 2014/033347 A1 | 3/2014 |

OTHER PUBLICATIONS

The Extended European Search Report dated May 29, 2017 for the related European Patent Application No. 15814838.7.

* cited by examiner

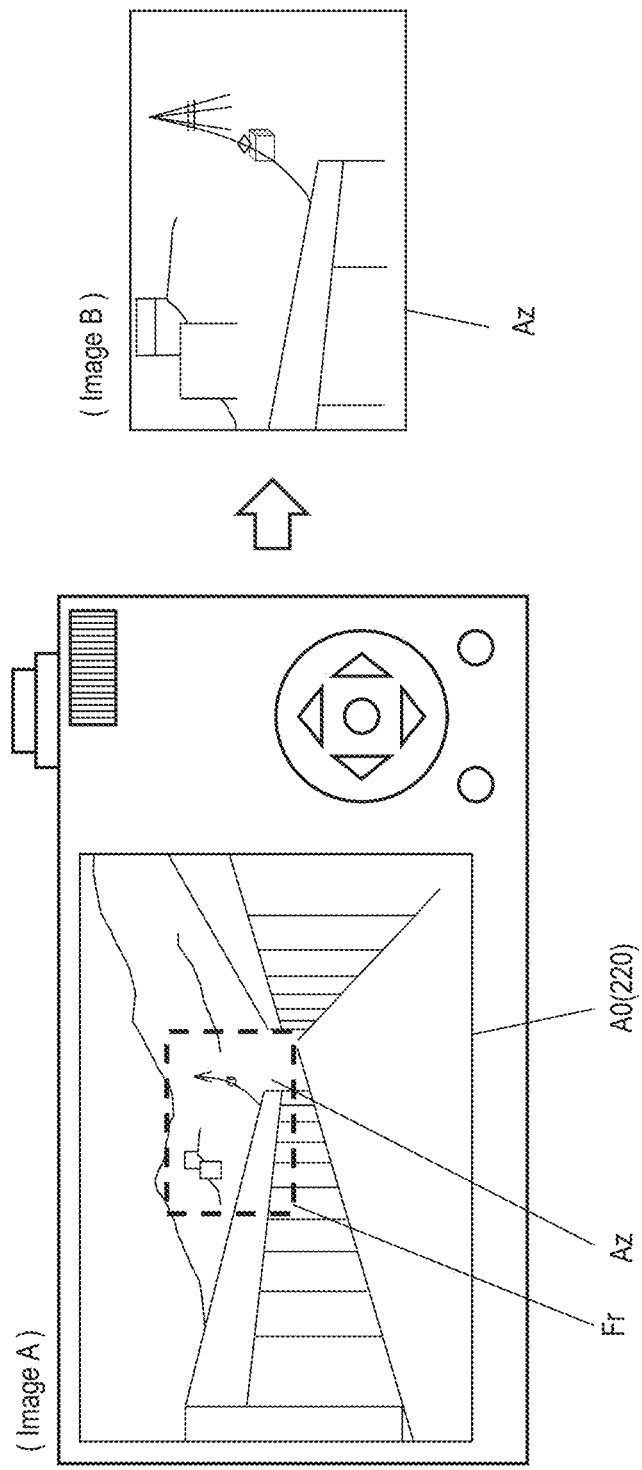

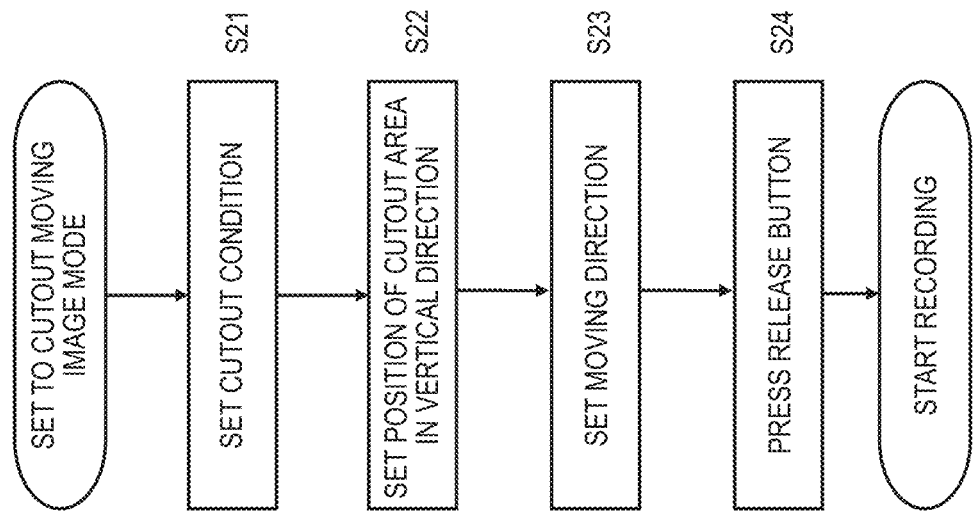
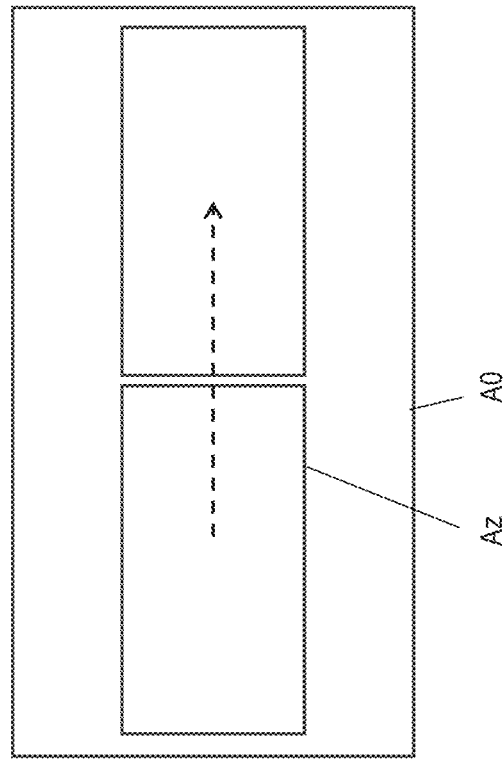

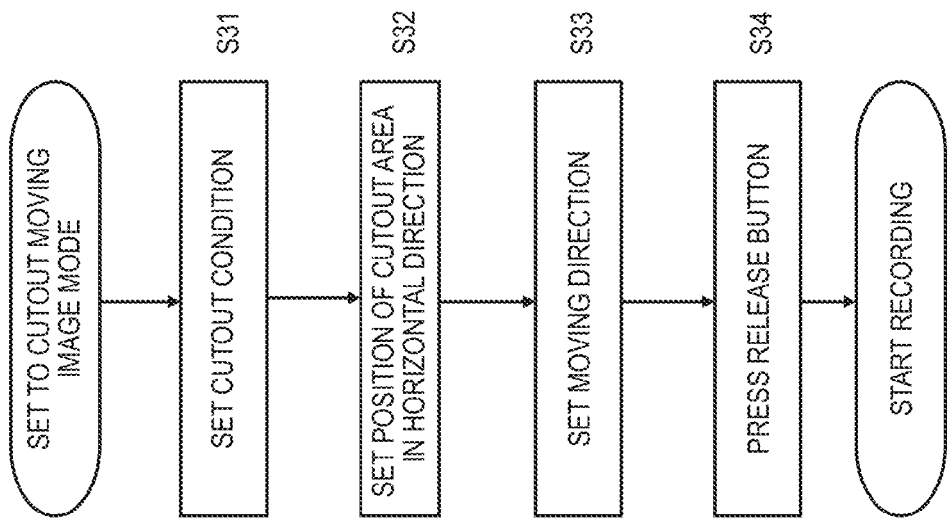
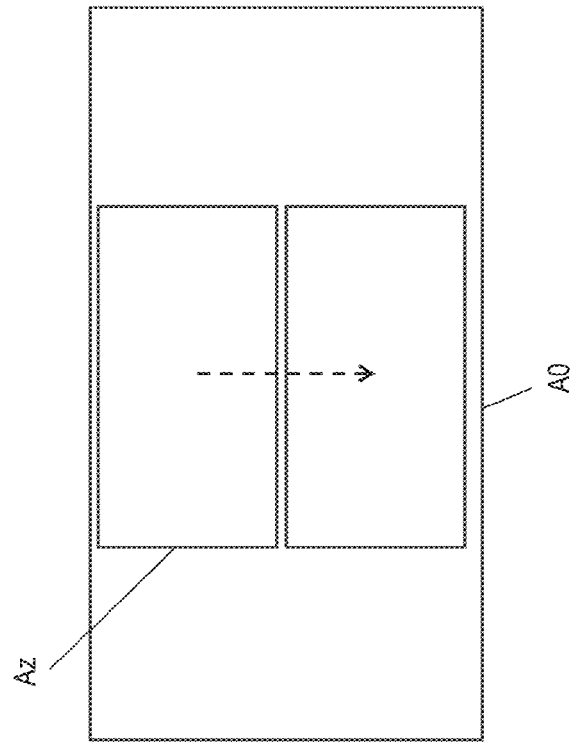

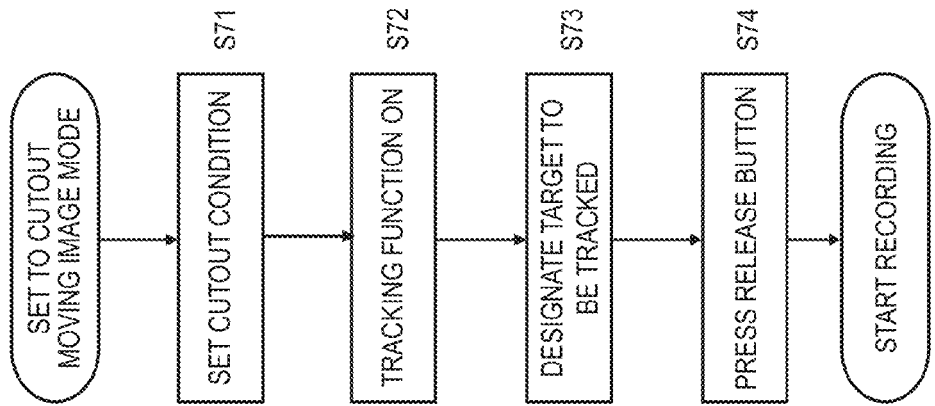
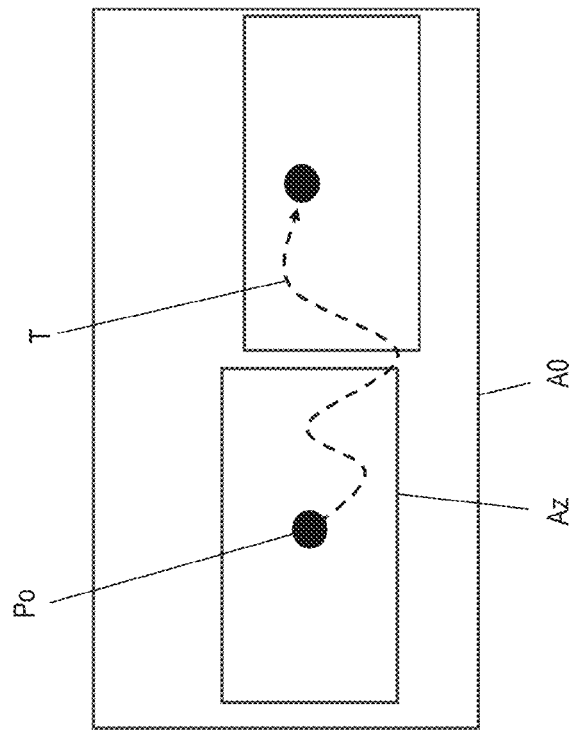

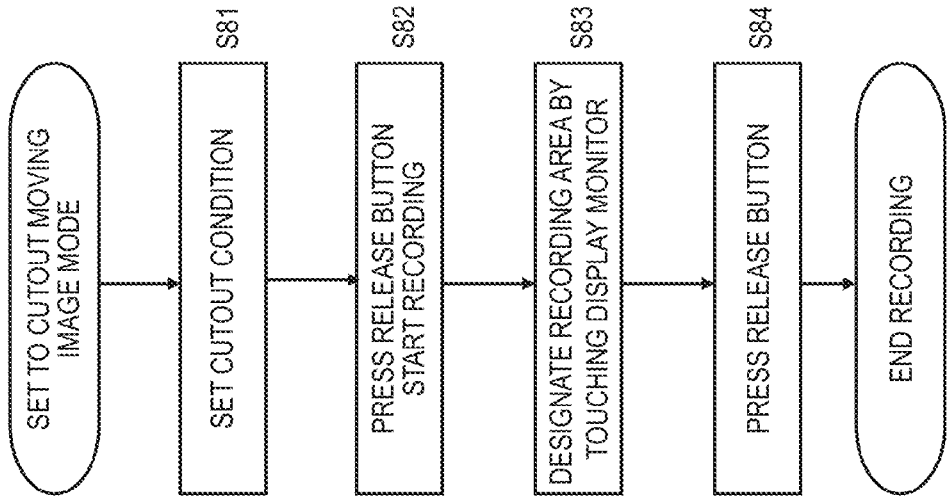
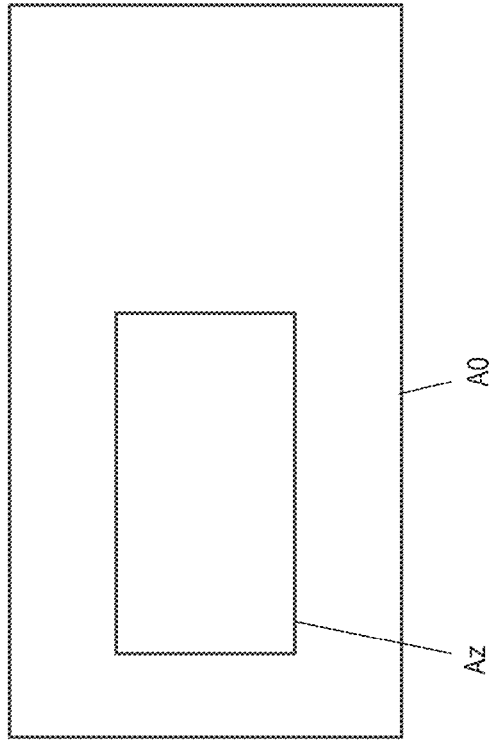

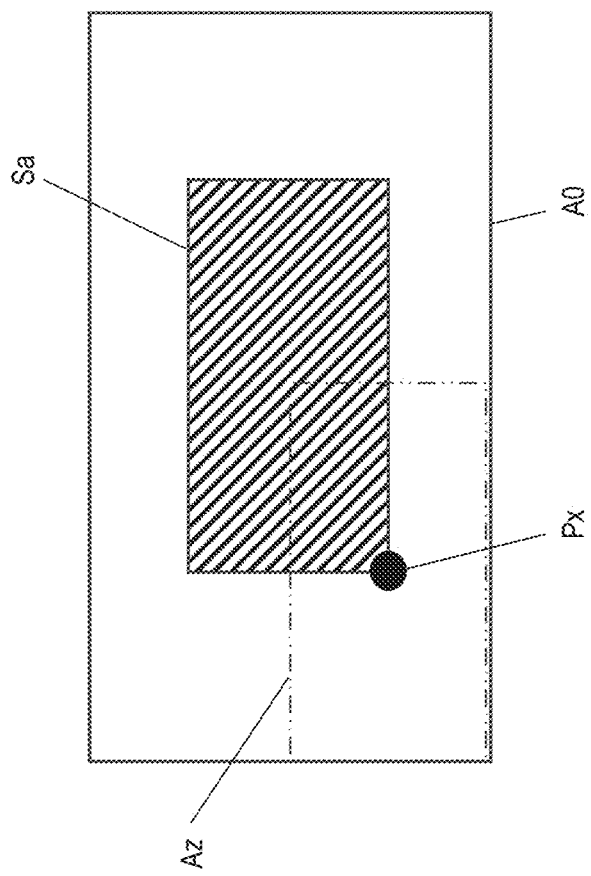

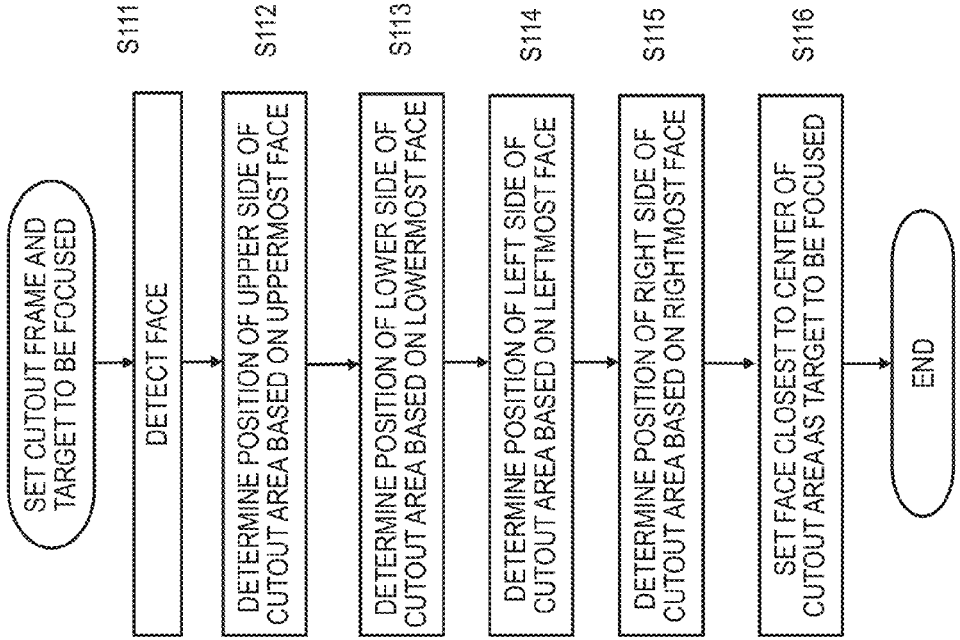
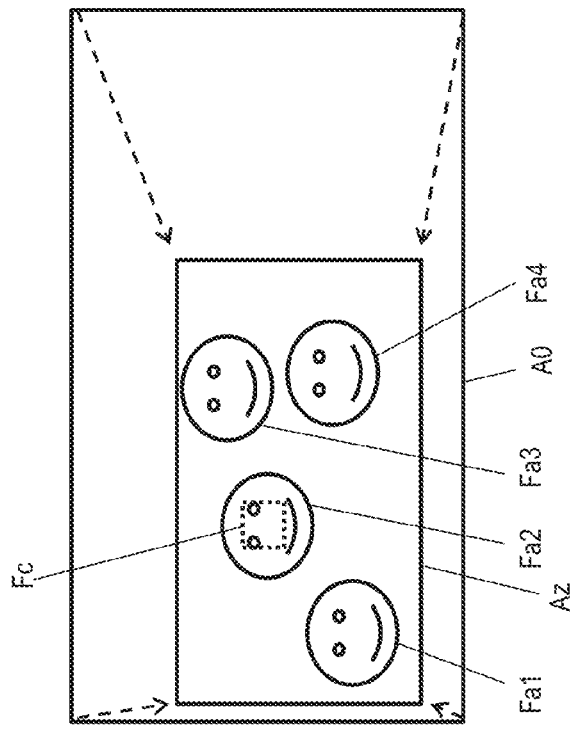

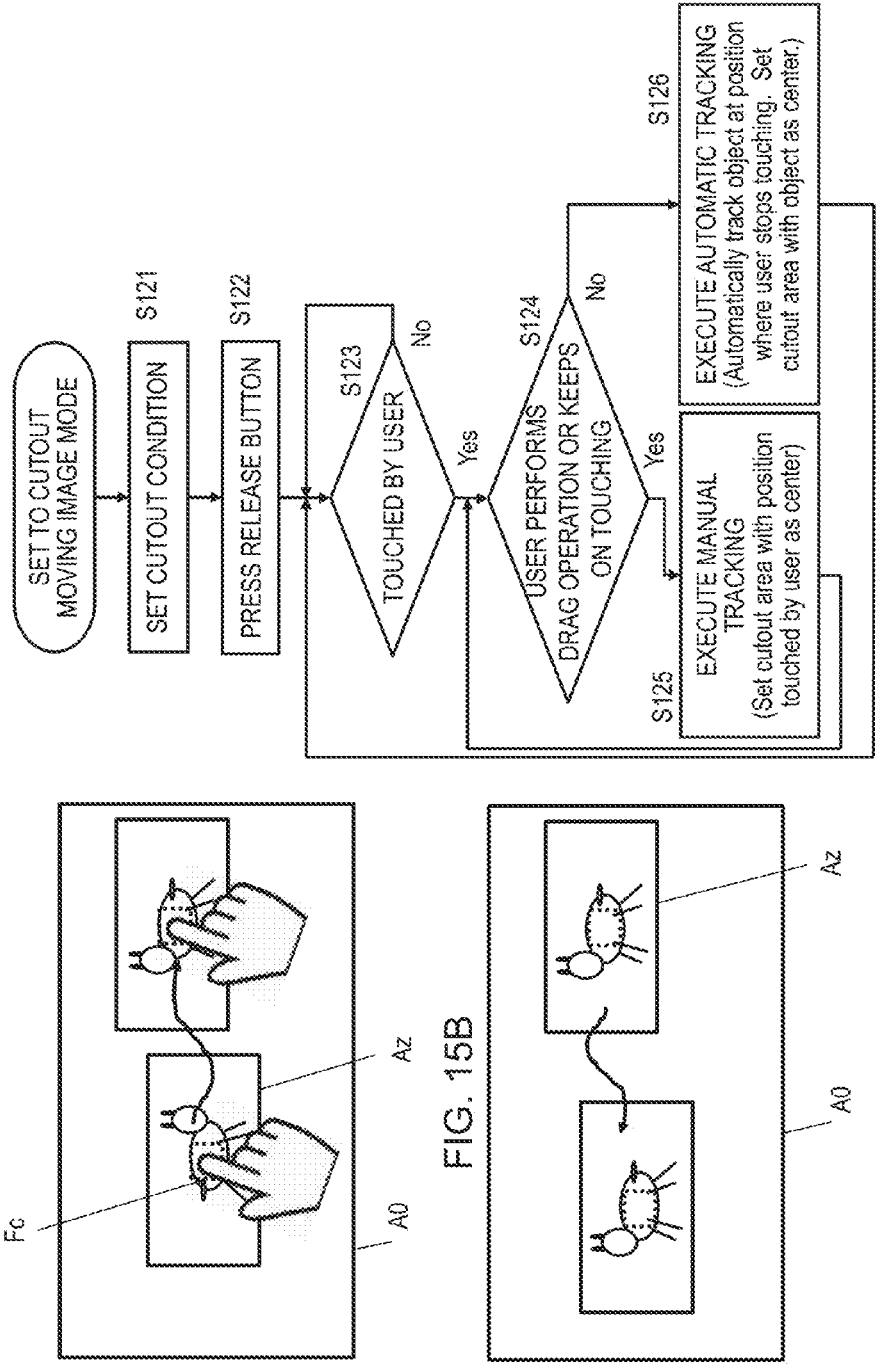

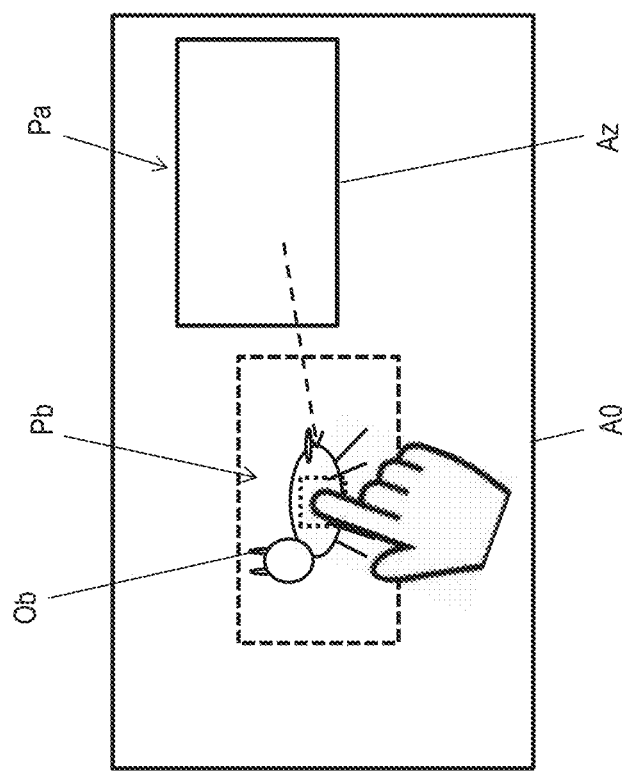

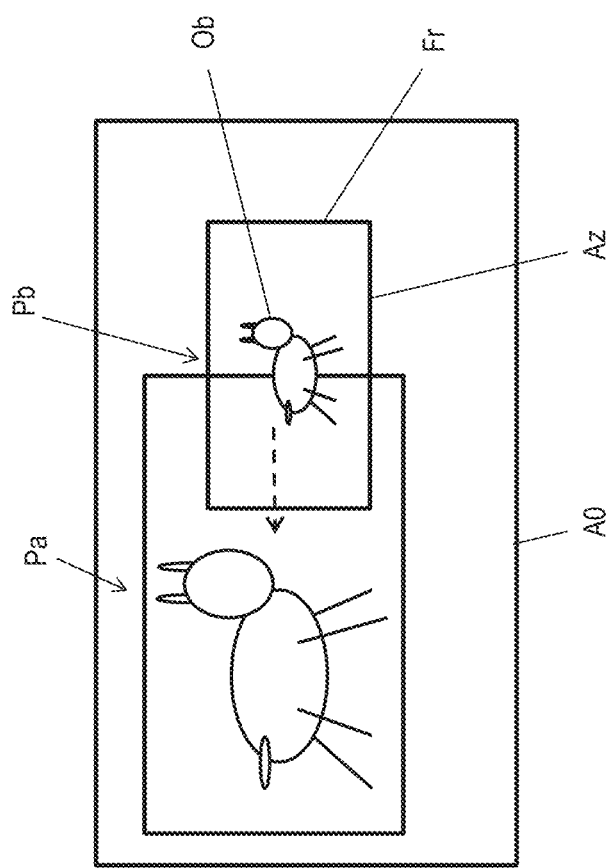

IMAGE-CAPTURING DEVICE

BACKGROUND

1. Technical Field

The present invention relates to an image-capturing device capable of capturing a moving image.

2. Description of the Related Art

For example, PTL 1 discloses an image-capturing device capable of capturing a moving image.

CITATION LIST

Patent Literature

PTL 1: Unexamined Japanese Patent Publication No. 2012-54920

SUMMARY

In order to capture a moving image such as a pan image or a tilt image, specialized equipment for panning or tilting an image-capturing device has been necessary.

The present disclosure provides an image-capturing device capable of capturing a moving image such as a pan image or a tilt image without requiring specialized equipment.

An image-capturing device according to the present disclosure includes: an image-capturing unit that captures a moving image and generates first moving image data; and a controller that generates second moving image data based on a cutout area obtained by cutting out a part of an entire area of a moving image indicated by the first moving image data and records the generated second moving image data on a recording medium. The controller changes at least one of a position and a size of the cutout area according to a predetermined instruction of a user and records resultant image data on the recording medium.

According to the present invention, a moving image in a part (cutout area) of the entire area of the image indicated by the first moving image data generated by the image-capturing unit is cut out to generate second moving image data, and the generated second moving image data is recorded on the recording medium. At that time, the position and/or the size of the cutout area is changed according to a predetermined instruction of a user, and then, the resultant image data is recorded on the recording medium. Accordingly, an image similar to an image obtained by panning or tilting the image-capturing device can be obtained. Consequently, data of a moving image such as a pan image or a tilt image can be obtained without requiring specialized equipment.

BRIEF DESCRIPTION OF THE DRAWINGS

FIG. 3 is a view for describing an outline of a cutout moving image mode.

FIG. 5A is a diagram for describing one example of a panning cutout.

FIG. 5B is a flowchart for describing one example of the panning cutout.

FIG. 6A is a diagram for describing one example of a tilting cutout.

FIG. 6B is a flowchart for describing one example of the tilting cutout.

FIG. 10A is a diagram for describing one example of an object tracking cutout.

FIG. 10B is a flowchart for describing one example of the object tracking cutout.

FIG. 11A is a diagram for describing one example of a 1-point AF designation area cutout.

FIG. 11B is a flowchart for describing one example of the 1-point AF designation area cutout.

FIG. 12 is a diagram for describing restriction in setting a cutout center position.

FIG. 14A is a diagram for describing one example of a face detection zoom cutout.

FIG. 14B is a flowchart for describing one example of the face detection zoom cutout.

FIG. 15A is a diagram for describing one example of a tracking method automatic switching cutout.

FIG. 15B is a diagram for describing one example of the tracking method automatic switching cutout.

FIG. 15C is a flowchart for describing one example of the tracking method automatic switching cutout.

FIG. 17 is a diagram for describing a state in which a mode is switched to the manual tracking after an object is lost during the execution of automatic tracking.

FIG. 18 is a diagram for describing one example of an object-size-change following tracking cutout.

DETAILED DESCRIPTION

Exemplary embodiments will be described below in detail with reference to the drawings as necessary. However, more than necessary detailed descriptions will sometimes be omitted. For example, detailed descriptions for matters which have already been well known in the art and redundant descriptions for substantially the same configurations will sometimes be omitted. This is to prevent the description below from becoming unnecessarily redundant to facilitate understanding of a person skilled in the art. Note that the accompanying drawings and the following description are provided by the inventors in order for a person of ordinary skill in the art to sufficiently understand the present disclosure, and they are not intended to limit the subject matter set forth in the claims.

Exemplary embodiments will be described below with reference to the drawings by taking a digital camera (image-capturing device) including a CCD (imaging device) as one example.

First Exemplary Embodiment

1. Configuration of Digital Camera (Image-Capturing Device)

Figure 1:
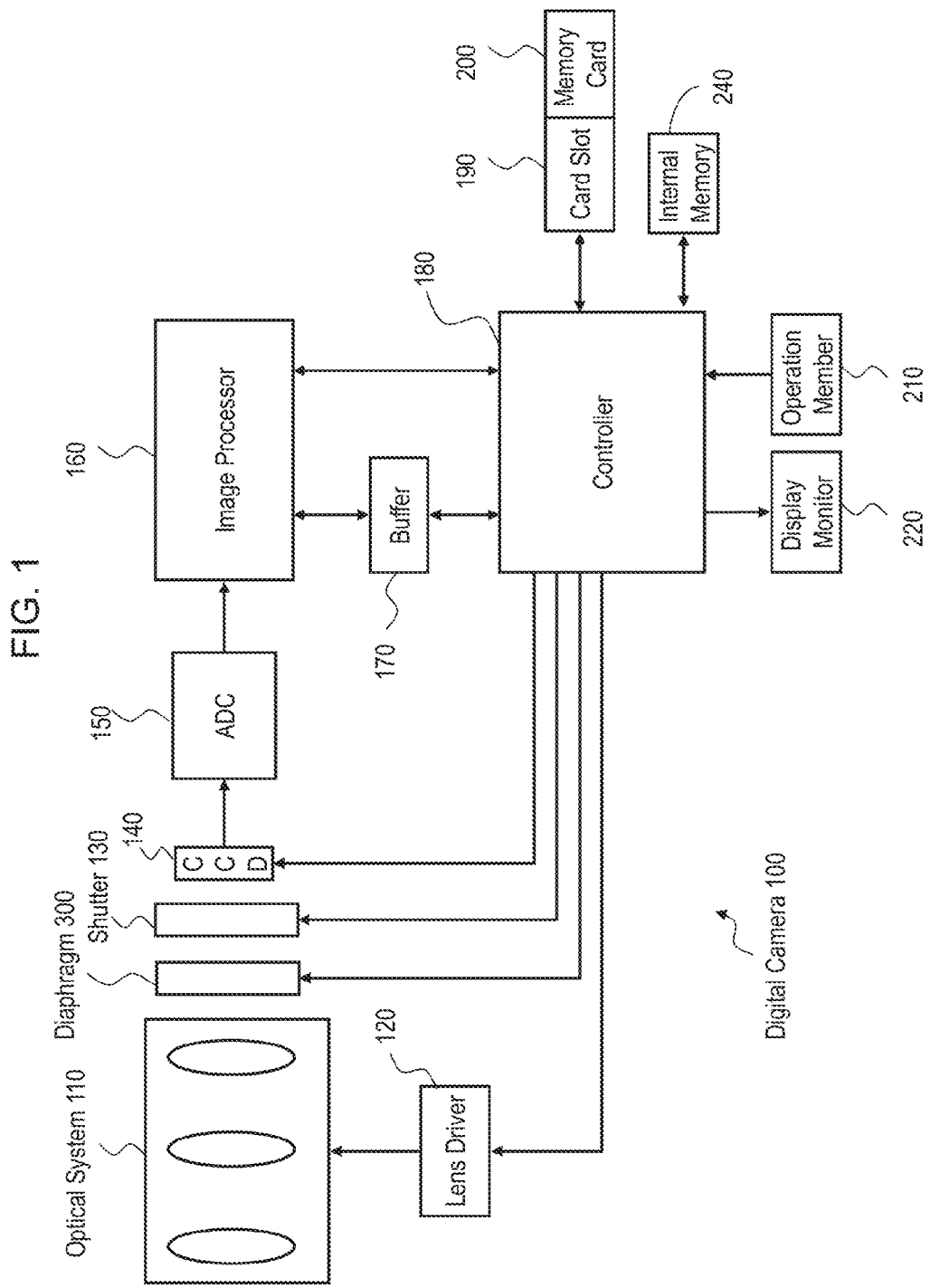
FIG. 1 is a block diagram illustrating a configuration of a digital camera according to a first exemplary embodiment.

Firstly, an example of an electric configuration of a digital camera according to the first exemplary embodiment will be described with reference to FIG. 1. FIG. 1 is a block diagram illustrating the configuration of digital camera 100. Digital camera 100 is an image-capturing device that captures an object image, which is formed by optical system 110 including one or more lenses, by CCD 140.

Image data generated by CCD 140 undergoes various processes in image processor 160, and is stored in memory card 200. The configuration of digital camera 100 will be described below in detail.

Optical system 110 includes a zoom lens, a focus lens, and the like. Optical system 110 can enlarge or reduce an object image by moving the zoom lens along an optical axis. Optical system 110 can also adjust a focus of an object image by moving the focus lens along the optical axis.

Lens driver 120 drives various lenses included in optical system 110. Lens driver 120 includes a zoom motor that drives the zoom lens, and a focus motor that drives the focus lens, for example.

Diaphragm 300 adjusts the size of an aperture for light, automatically or according to a user setting, to adjust an amount of transmitting light.

Shutter 130 is a unit to block light transmitting to CCD 140.

CCD 140 captures an object image formed by optical system 110 to generate image data. CCD 140 includes a color filter, a light-receiving element, and an AGC (Auto Gain Controller). The light-receiving element converts an optical signal collected by interchangeable lens 101 into an electric signal to generate image information. The AGC amplifies the electric signal output from the light-receiving element. CCD 140 also includes a drive circuit and the like for performing various operations such as exposure, transfer, or electronic shutter.

ADC 150 (A/D converter: analog-digital converter) converts the analog image data generated by CCD 140 into digital image data.

Image processor 160 performs various processes to the digital image data, which is generated by CCD 140 and converted, in response to the control of controller 180. Image processor 160 generates image data to be displayed onto display monitor 220 or generates image data to be stored in memory card 200. For example, image processor 160 performs various processes such as a gamma correction process, a white balance correction process, or a flaw correction process to the image data generated by CCD 140. Image processor 160 also compresses the image data generated by CCD 140 in a compression format or the like according to H.264 standard or MPEG2 standard. Image processor 160 can be implemented by a DSP (Digital Signal Processor) or a microcomputer. In addition, image processor 160 can generate image data of a moving image having about 4000×2000 pixels, that is, image data of a so-called 4K moving image (hereinafter referred to as "4K moving image data" as necessary), based on the image data generated by CCD 140. Image processor 160 can also perform various processes described below to the generated 4K moving image data.

Controller 180 is a control unit that entirely controls digital camera 100. Controller 180 can be implemented by a semiconductor element. Controller 180 may be configured by only hardware, or may be implemented by a combination of hardware and software. Controller 180 can be implemented by a microcomputer, a CPU, an MPU (Micro-Processing Unit), an ASIC (Application Specific Integrated Circuit), an FPGA (Field-Programmable Gate Array), and the like.

For example, controller 180 detects a moving object in an image indicated by image data generated by image processor 160, and tracks this object. While tracking the object, controller 180 acquires information indicating the position of the object in 4K moving image data.

Controller 180 can also control lens driver 120 such that optical system 110 focuses on the object present in the image, based on the contrast or the like of the entire image indicated by the image data generated by image processor 160. Controller 180 can also control lens driver 120 such that optical system 110 focuses on the object present in a part (cutout area) of the image indicated by the image data generated by the image processor 160, based on the contrast or the like of the part (cutout area).

Controller 180 can also detect the brightness of the entire image indicated by the image data generated by image processor 160, the brightness of an object present in the image, or the brightness of a designated portion in the image, and can automatically adjust an exposure amount at the time of capturing based on the detected brightness.

Buffer 170 functions as a work memory for image processor 160 and controller 180. Buffer 170 can be implemented by a DRAM (Dynamic Random Access Memory), a ferroelectric memory, or the like.

Memory card 200 can be inserted and removed to or from card slot 190. Card slot 190 is mechanically and electrically connectable to memory card 200.

Memory card 200 includes therein a flash memory, a ferroelectric memory, or the like, and can store data such as an image file generated by image processor 160.

Internal memory 240 is configured by a flash memory, a ferroelectric memory, or the like. Internal memory 240 stores a control program or the like for controlling the whole of digital camera 100.

Operation member 210 is a general term for a user interface accepting an operation from a user. A cross key, an enter button, and the like which receive an operation from a user correspond to operation member 210.

Display monitor 220 can display an image (through image) indicated by image data generated by CCD 140 or an image indicated by image data read from memory card 200. Display monitor 220 can also display various menu screens on which the user performs various settings of digital camera 100.

Display monitor 220 is a touch panel that can accept an instruction made by a user's touch operation. When the screen is touched, display monitor 220 outputs a signal indicating the touched position to controller 180. At that time, controller 180 controls the operation of digital camera 100 based on the signal indicating the touched position.

Figure 2:
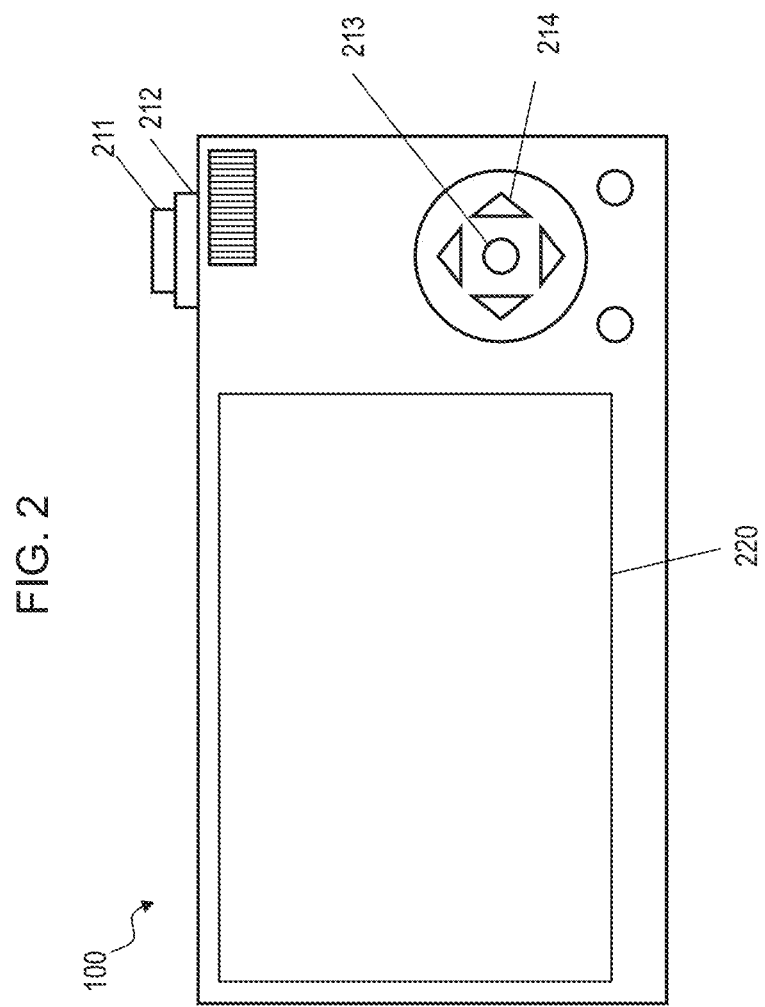
FIG. 2 is a back view of the digital camera.

Operation member 210 is a general term for operation buttons or operation dials mounted on the exterior of digital camera 100, and accepts an operation to digital camera 100 from a user. For example, as illustrated in FIG. 2, operation member 210 includes release button 211, zoom lever 212, center button 213, cross button 214, and the like. When accepting an operation from the user, operation member 210 transmits various operation instruction signals to controller 180.

2. Operation of Digital Camera in Cutout Moving Image Mode

Digital camera 100 has a capturing mode (hereinafter referred to as a "cutout moving image mode" as necessary) of generating moving image data (hereinafter referred to as "cutout moving image data" as necessary) based on a cutout area obtained by cutting out a part of the entire area of a moving image indicated by 4K moving image data, and recording the generated cutout moving image data into memory card 200, during capturing. Generating cutout moving image data is hereinafter referred to as "to cut out an image" as necessary. Further, the moving image thus generated is hereinafter referred to as a "cutout moving image" as necessary.

The cutout moving image data is moving image data having 1920×1080 pixels (hereinafter referred to as "2K moving image data" as necessary). That is, the cutout moving image has the same resolution as the resolution of a full-spec Hi-Vision with 1920×1080 pixels. Generally, it is sufficient that 2K moving image data have about 2000×1000 pixels. In the present exemplary embodiment, 2K moving image data has 1920×1080 pixels.

In the cutout moving image mode, controller 180 controls image processor 160 so as to generate an image in a cutout area in a 4K moving image indicated by 4K moving image data as 2K moving image data. Image processor 160 performs a compression process to the generated 2K moving image data according to H.264 standard or the like, and records the resultant image data on memory card 200.

In the case where the number of pixels of the cutout area in the 4K moving image is 1920×1080, image processor 160 cuts out image data of the cutout area in the 4K moving image data to generate 2K moving image data (cutout moving image data).

When the number of pixels of the image in the cutout area is larger than 1920×1080, image processor 160 performs a thinning process to the image data of the cutout area to generate image data having 1920×1080 pixels. On the other hand, when the number of pixels of the cutout area is smaller than 1920×1080, image processor 160 performs an interpolation process based on the image data of the cutout area to generate image data having 1920×1080 pixels. The thinning process and the interpolation process can be performed using a known method.

Controller 180 also controls lens driver 120 such that optical system 110 focuses on the object present in the cutout area based on the contrast or the like of the image in the cutout area in the cutout moving image mode.

Controller 180 also automatically adjusts an exposure amount based on the brightness of the image in the cutout area in the cutout moving image mode.

FIG. 3 is a view for describing an outline of the cutout moving image mode. In the cutout moving image mode, as illustrated in image A in FIG. 3, controller 180 displays frame Fr indicating cutout area Az on display monitor 220 as being superimposed on 4K moving image data generated by image processor 160. Display monitor 220 displays entire area A0 (hereinafter referred to as "4K moving image area A0" as necessary) of the 4K moving image indicated by the 4K moving image data. Note that the present exemplary embodiment describes an example of a 1-point AF designation area cutout described later. Controller 180 generates 2K moving image data (cutout moving image data) corresponding to cutout area Az as illustrated in image B in FIG. 3 based on the image data in cutout area Az.

Figure 4A:
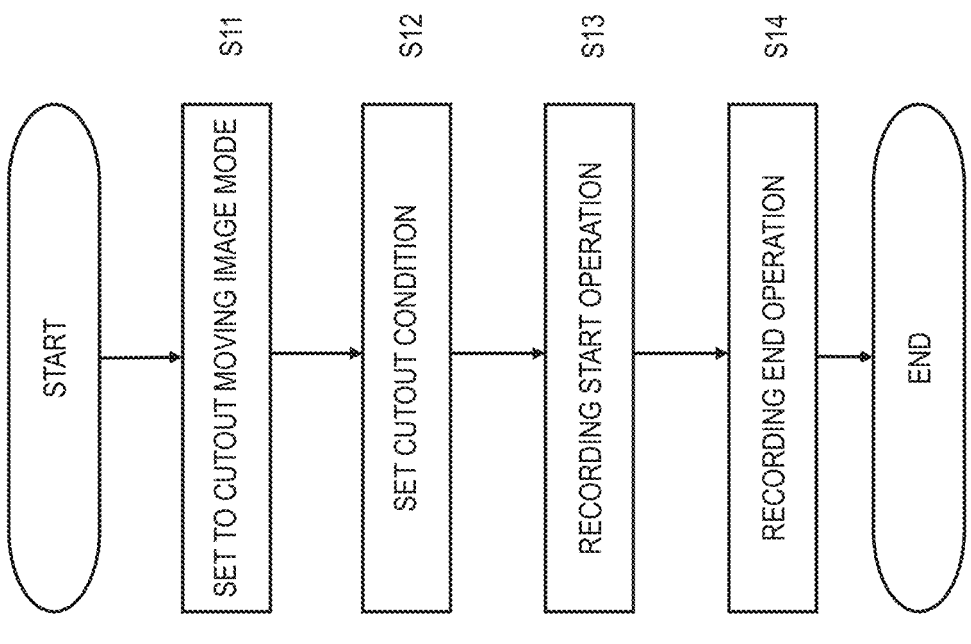
FIG. 4A is a flowchart illustrating a procedure of capturing a cutout moving image.

Next, the procedure of capturing a cutout moving image will be described. FIG. 4A is a flowchart illustrating the procedure of capturing a cutout moving image.

Firstly, a user operates center button 213 or cross button 214 while confirming the display on display monitor 220, to set the capturing mode to the cutout moving image mode (step S11). Thus, controller 180 accepts an instruction to set the capturing mode to the cutout moving image mode through center button 213 and cross button 214.

The user operates center button 213 and cross button 214 while confirming the display on display monitor 220 to set a cutout condition concerning the position, the range, and the like of cutout area Az (step S12). With this, controller 180 accepts an instruction concerning the cutout condition in the cutout moving image mode through center button 213 and cross button 214. The details of the cutout condition will be described below.

The user presses release button 211. Accordingly, controller 180 starts capturing with a set cutout pattern (step S13). Controller 180 generates 2K moving image data of cutout area Az from the captured 4K moving image data, and records the generated 2K moving image data on memory card 200.

The user again presses release button 211. Thus, controller 180 ends capturing of the cutout moving image with the set cutout pattern (step S14).

Figure 4B:
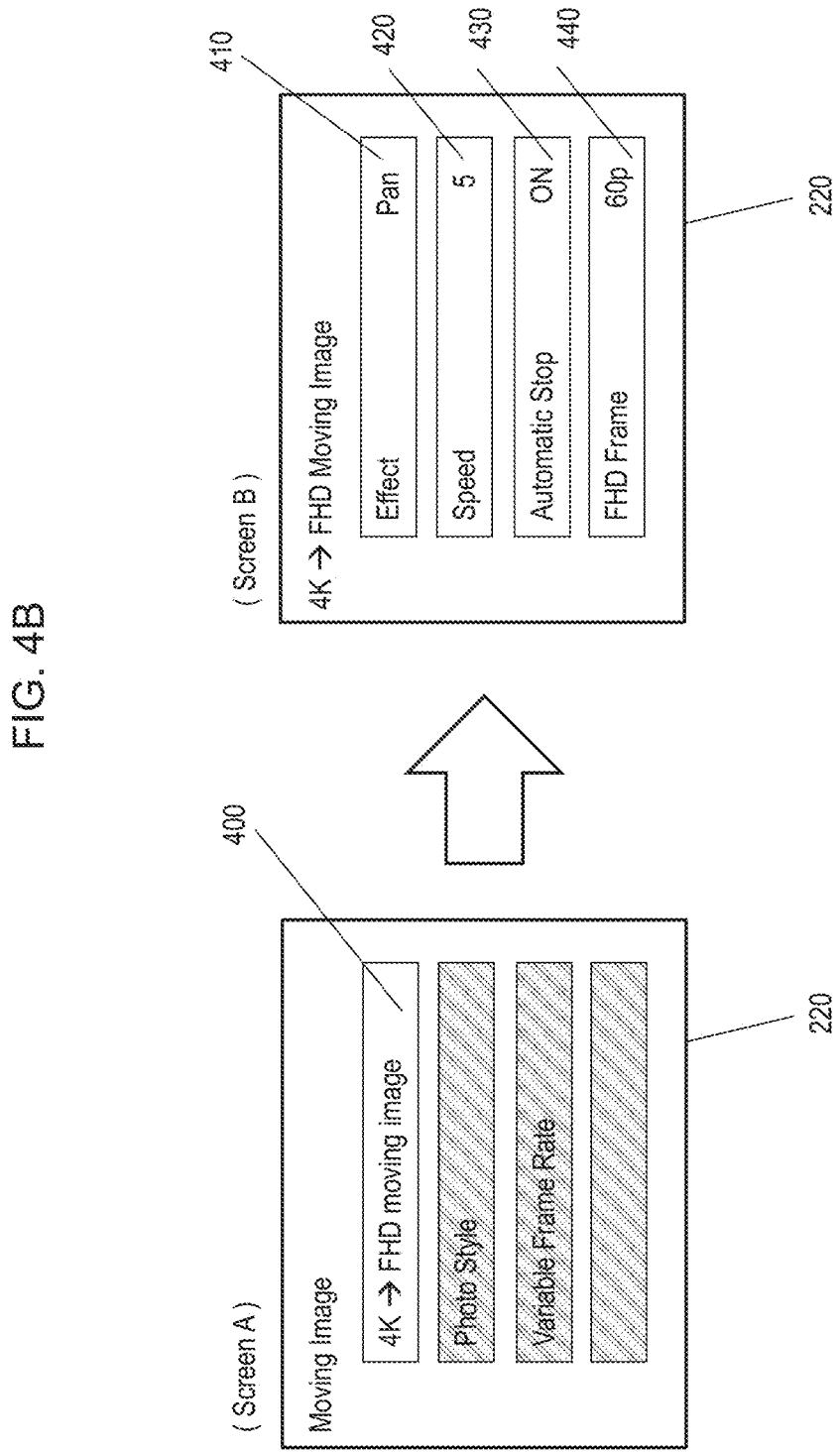
FIG. 4B is a view illustrating an example of a setting screen used for capturing a cutout moving image.

FIG. 4B is a display example of display monitor 220 when the user sets the capturing mode to the cutout moving image mode and when the user sets the cutout condition in steps S11 and S12 in FIG. 4A.

The user selects a predetermined item from the menu screen to display a moving image setting menu illustrated in screen A in FIG. 4B. The user can set the cutout moving image mode by selecting item 400 on the moving image setting menu (step S11 in FIG. 4A). When the user selects item 400, a detail setting screen shown in screen B in FIG. 4B is displayed on display monitor 220.

The user can change settings of four items on the detail setting screen. The specific example of the four items will be described below.

The user can set, with item 410, an effect when recording the cutout moving image. As effects for a cutout moving image, digital camera 100 has a panning cutout, a tilting cutout, a zoom cutout, a panning/tilting cutout with designated starting point/ending point, a cutout with designated movement path, an object tracking cutout, a 1-point AF designation area cutout, a face detection panning/tilting cutout, a face detection zoom cutout, a tracking method automatic switching cutout, and an object-size-change following tracking cutout. The user can select the desired effect from the above effects by changing the setting for item 410.

The user can set, with item 420, a moving speed of cutout area Az when applying the effect described above. The digital camera according to the present exemplary embodiment can set a moving speed to one of five levels. Specifically, the user can set a moving speed within the range from 1 (low speed) to 5 (high speed). Note that the level of a moving speed that can be set is not limited to five. In addition, as an option for a moving speed, the moving speed in which the speed is changed from the start of the movement to the end of the movement may be set. For example, a manner of gradually decreasing a moving speed after the start of the cutout or a manner of gradually increasing the moving speed after the start of the cutout can be set. Note that, when the user selects the object tracking cutout, the tracking method automatic switching cutout, and the object-size-change following tracking cutout as the effect, the setting of the moving speed is unnecessary.

The user can select, with item 430, whether or not the recording of a cutout moving image is automatically ended when the effect set with item 410 is finished. When the automatic stop is set to ON, digital camera 100 automatically ends the recording of the cutout moving image when the effect is finished. When the automatic stop is set to OFF, digital camera 100 continuously performs the recording of the cutout moving image even after the effect is finished. Note that, when the object tracking cutout, the 1-point AF designation area cutout, the tracking method automatic switching cutout, and the object-size-change following tracking cutout are selected as the effect with item 410, the setting of the automatic stop is unnecessary.

The user can set, with item 440, a frame rate when recording the cutout moving image. The user can select a frame rate of 30 p or 60 p in digital camera 100 according to the present exemplary embodiment. Note that the options for the frame rate are not limited thereto.

Digital camera 100 records the cutout moving image according to the cutout moving image recording setting set as described above. The details of each of the cutout patterns will be described below.

3. Cutout Pattern 3-1. Panning Cutout, Tilting Cutout 3-1-1. Panning Cutout

FIG. 5A is a diagram for describing one example of a panning cutout. FIG. 5B is a diagram illustrating an example of an operation procedure in performing the panning cutout. The panning cutout is such that, during capturing of a moving image, a cutout moving image (2K moving image) is generated, while cutout area Az is moved in 4K moving image area A0 in the horizontal direction.

The position of cutout area Az in the vertical direction can be set to an arbitrarily height. FIG. 5A illustrates a case where a cutout area is panned at almost the center of display monitor 220. The moving direction of cutout area Az (the direction of panning) can be set from right to left or from left to right in the horizontal direction. FIG. 5A illustrates a case where the moving direction (direction of panning) is from left to right in the horizontal direction.

When the panning cutout is performed, the user operates the operation system such as center button 213 or cross button 214 to issue various instructions to digital camera 100. As illustrated in FIG. 5B, digital camera 100 executes various settings and controls according to the instructions from the user. This will specifically be described below.

Firstly, the user designates a cutout condition in the cutout moving image mode. The user selects the panning cutout mode as an effect from the cutout conditions. The cutout condition can be set on the screen illustrated in FIG. 4B. Note that a moving speed is previously designated in the present exemplary embodiment. Further, the automatic stop is assumed to be set to OFF. Digital camera 100 sets the cutout condition designated by the user (step S21).

Then, the user designates the position of cutout area Az in the vertical direction in the panning cutout. Specifically, the user can set the position of cutout area Az in the vertical direction by touching an arbitrary position on display monitor 220. Note that, the position of cutout area Az in the vertical direction may be selected from predetermined options. For example, the position of cutout area Az in the vertical direction may be selected from three areas which are high, middle, and low areas. Digital camera 100 sets the recording position based on the position of cutout area Az in the vertical direction designated by the user (step S22).

Then, the user designates the moving direction of cutout area Az in the horizontal direction in the panning cutout. Specifically, the user designates the moving direction of cutout area Az in the horizontal direction to the direction from right to left or the direction from left to right. Digital camera 100 sets the moving direction of cutout area Az designated by the user (step S23).

After the above-mentioned settings are completed, digital camera 100 is brought into a state capable of recording the cutout moving image with the panning cutout. When the user presses release button 211 in this state (step S24), digital camera 100 starts to record the cutout moving image. During the recording of the cutout moving image, digital camera 100 records the moving image data while moving cutout area Az in the designated direction at designated speed.

Since the automatic stop is set to OFF as described above, digital camera 100 according to the present exemplary embodiment keeps on recording the moving image in cutout area Az even after cutout area Az moves to the end position of the movement. When the user again presses release button 211, digital camera 100 ends the recording of the cutout moving image.

In digital camera 100 according to the present exemplary embodiment, the position of cutout area Az in the vertical direction can be set in the panning cutout. However, it may be configured such that cutout area Az automatically moves in the horizontal direction in the central area of display monitor 220 in the vertical direction.

Figure 5D:
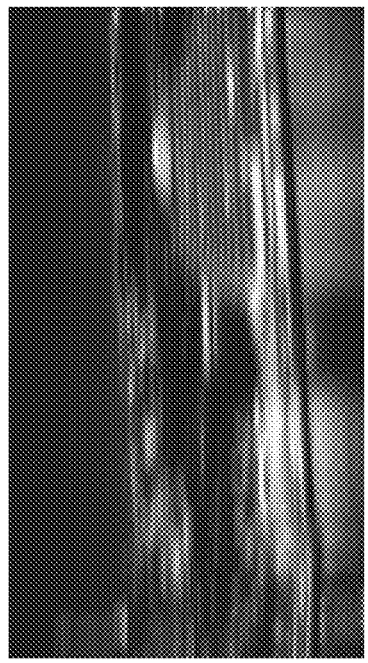
FIG. 5D is a view for describing an effect of the panning cutout when a night scene is captured.
Figure 5C:
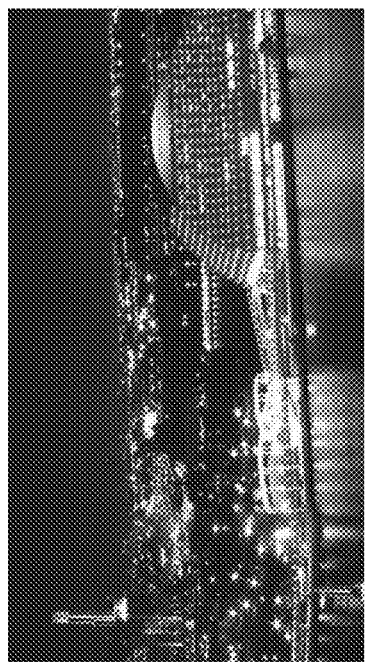
FIG. 5C is a view for describing an effect of the panning cutout when a night scene is captured.

According to the panning cutout, the effects described below can be obtained. FIGS. 5C and 5D are views for describing the effect of the panning cutout when a night scene is captured. For example, when a night scene is captured, a shutter speed is likely to become slow. Therefore, when a digital camera is actually panned, a blurred image is generated as illustrated in FIG. 5D. On the other hand, in the panning cutout of digital camera 100 according to the present disclosure, the user does not have to actually pan digital camera 100, whereby the generation of a blurred image is prevented as illustrated in FIG. 5C. Further, according to the panning cutout, the user can generate a moving image, which is precisely panned, without requiring special equipment or special skills.

Note that, in the panning cutout, an AF area (autofocus area) is set in the area of cutout area Az close to the movement destination of cutout area Az, for example. Accordingly, digital camera 100 can quickly focus on an object entering cutout area Az due to the movement of cutout area Az. Note that, the AF area (autofocus area) may be set at the center of cutout area Az (the center of cutout area Az in the longitudinal direction and in the transverse direction). With this, digital camera 100 can keep on focusing on a central part of an image to which a line of sight of a user is likely to be directed.

Note that the movement, enlargement, or reduction of cutout area Az in the panning cutout and various cutouts described below mean that cutout area Az is moved, enlarged, or reduced between frames (pictures) constituting 4K moving image data. Cutout area Az is not moved, enlarged, and reduced in one frame (picture). Accordingly, a still image indicated by each frame (picture) constituting the cutout moving image data becomes an image having no blur caused by the movement or the like.

3-1-2. Tilting Cutout

FIG. 6A is a diagram for describing one example of a tilting cutout. FIG. 6B is a diagram illustrating an example of an operation procedure in performing the tilting cutout. The tilting cutout is such that, during capturing of a moving image, a cutout moving image (2K moving image) is generated, while cutout area Az is moved in 4K moving image area A0 in the vertical direction.

The moving direction of cutout area Az (the direction of tilting) can be set to the direction from top to bottom or the direction from bottom to top in the vertical direction. The configuration concerning the other settings is similar to that for the panning cutout. Note that FIG. 6A illustrates a case where the moving direction (direction of tilting) is from top to bottom in the vertical direction.

When the tilting cutout is performed, the user operates the operation system such as center button 213 or cross button 214 to issue various instructions to digital camera 100. As illustrated in FIG. 6B, digital camera 100 executes various settings and controls according to the instructions from the user. This will specifically be described below.

Firstly, the user designates a cutout condition in the cutout moving image mode. The user selects the tilting cutout mode as an effect from the cutout conditions. The cutout condition can be set on the screen illustrated in FIG. 4B. Note that a moving speed is previously designated in the present exemplary embodiment. Further, the automatic stop is assumed to be set to OFF. Digital camera 100 sets the cutout condition designated by the user (step S31).

Then, the user designates the position of cutout area Az in the horizontal direction in the tilting cutout. Specifically, the user can set the position of cutout area Az in the horizontal direction by touching an arbitrary position on display monitor 220. Note that, the position of cutout area Az in the horizontal direction may be selected from predetermined options. For example, the position of cutout area Az in the horizontal direction may be selected from three areas which are left, middle, and right areas. Digital camera 100 sets the recording position based on the position of cutout area Az in the horizontal direction designated by the user (step S32).

Then, the user designates the moving direction of cutout area Az in the vertical direction in the tilting cutout. Specifically, the user designates the moving direction of cutout area Az in the vertical direction to the direction from top to bottom or the direction from bottom to top. Digital camera 100 sets the moving direction of cutout area Az designated by the user (step S33).

After the above-mentioned settings are completed, digital camera 100 is brought into a state capable of recording the cutout moving image with the tilting cutout. When the user presses release button 211 with this state (step S34), digital camera 100 starts to record the cutout moving image. During the recording of the cutout moving image, digital camera 100 records the moving image data while moving cutout area Az in the designated direction at designated speed.

Since the automatic stop is set to OFF as described above, digital camera 100 according to the present exemplary embodiment keeps on recording the moving image in cutout area Az even after cutout area Az moves to the end position of the movement. When the user again presses release button 211, digital camera 100 ends the recording of the cutout moving image.

In digital camera 100 according to the present exemplary embodiment, the position of cutout area Az in the horizontal direction can be set in the tilting cutout. However, it may be configured such that cutout area Az automatically moves in the vertical direction in the central area of display monitor 220 in the horizontal direction.

According to the tilting cutout, the effects described below can be obtained. For example, when a night scene is captured, a shutter speed is likely to become slow. Therefore, when a digital camera is actually tilted, a blurred image is generated. On the other hand, in the tilting cutout of digital camera 100 according to the present disclosure, the user does not have to actually tilt digital camera 100, whereby the generation of a blurred image is prevented. Further, according to the tilting cutout, the user can generate a moving image, which is precisely tilted, without requiring special equipment or special skills.

Note that, in the tilting cutout, an AF area (autofocus area) is set in the area of cutout area Az close to the movement destination of cutout area Az. Accordingly, digital camera 100 can quickly focus on an object entering cutout area Az due to the movement of cutout area Az. Note that, the AF area (autofocus area) may be set at the center of cutout area Az (the center of cutout area Az in the longitudinal direction and in the transverse direction). With this, digital camera 100 can keep on focusing on a central part of an image to which a line of sight of a user is likely to be directed.

3-2. Zoom Cutout with Designated Center

Figure 7B:
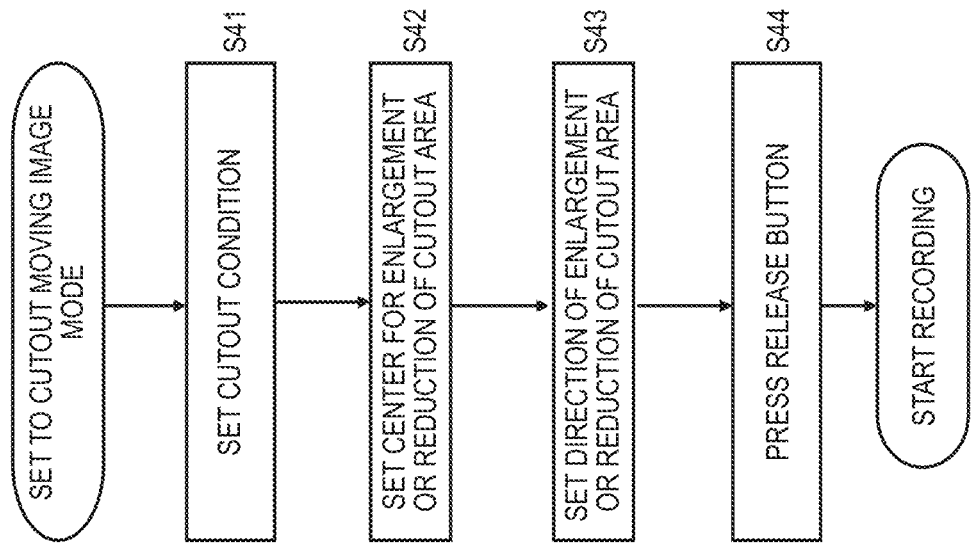
FIG. 7B is a flowchart for describing one example of the zoom cutout with designated center.
Figure 7A:
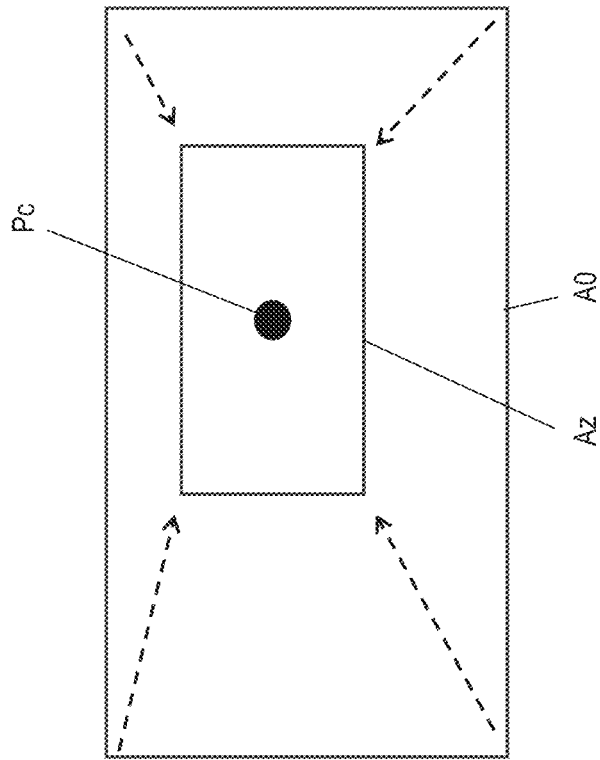
FIG. 7A is a diagram for describing one example of a zoom cutout with designated center.

FIG. 7A is a diagram for describing one example of a zoom cutout with designated center. FIG. 7B is a diagram illustrating an example of an operation procedure in performing the zoom cutout with designated center. The zoom cutout with designated center is such that, during capturing of a moving image, a cutout moving image (2K moving image) is generated, while cutout area Az is enlarged or reduced around center (zoom center) Pc for the enlargement or reduction set by the user in 4K moving image area A0.

The direction of enlarging or reducing cutout area Az (the direction of zooming an object) can be set to a direction of enlarging cutout area Az (direction of zooming out the object) or a direction of reducing cutout area Az (direction of zooming in the object). FIG. 7A illustrates a case where the direction of enlarging or reducing cutout area Az (the direction of zooming an object) is the direction of reducing cutout area Az (the direction of zooming in the object). In the case of reducing cutout area Az (in the case of zooming in), the initial value of the size of cutout area Az is set to be the same size as the entire area of 4K moving image area A0, for example. The magnification of enlarging or reducing cutout area Az may be a predetermined value, or may arbitrarily be set. In the case of enlarging cutout area Az (in the case of zooming out), the initial value of the size of cutout area Az is set to be the same size as the entire area of 2K moving image area, for example.

When the zoom cutout with designated center is performed, the user operates the operation system such as center button 213 or cross button 214 to issue various instructions to digital camera 100. As illustrated in FIG. 7B, digital camera 100 executes various settings and controls according to the instructions from the user. This will specifically be described below.

Firstly, the user designates a cutout condition in the cutout moving image mode. The user selects the zoom cutout with designated center mode as an effect from the cutout conditions. The cutout condition can be set on the screen illustrated in FIG. 4B. Note that a moving speed is previously designated in the present exemplary embodiment. Further, the automatic stop is assumed to be set to OFF. Digital camera 100 sets the cutout condition designated by the user (step S41).

Then, the user designates the position of center Pc (zoom center Pc of the object) for enlargement or reduction of cutout area Az for the zoom cutout with designated center. Specifically, the user can set the position of center Pc for enlargement or reduction of cutout area Az by touching an arbitrary position on display monitor 220. Note that, the position of center Pc for enlargement or reduction of cutout area Az may be selected from predetermined options. For example, the position of center Pc for enlargement or reduction of cutout area Az may be selected from three areas which are left, middle, and right areas in the horizontal direction, from three areas which are high, middle, and low areas in the vertical direction, or from nine areas which are the combination of these areas. Digital camera 100 sets the recording position of cutout area Az based on the position of center Pc for enlargement or reduction of cutout area Az designated by the user (step S42).

Then, the user designates the direction of enlarging or reducing cutout area Az (the direction of zooming the object) for the zoom cutout with designated center. Specifically, the user designates the direction of enlarging or reducing cutout area Az to the direction of enlarging cutout area Az or the direction of reducing cutout area Az. Digital camera 100 sets the direction of enlarging or reducing cutout area Az (the direction of zooming the object) designated by the user (step S43).

After the above-mentioned settings are completed, digital camera 100 is brought into a state capable of recording the cutout moving image with the zoom cutout with designated center. When the user presses release button 211 in this state (step S44), digital camera 100 starts to record the cutout moving image. During the recording of the cutout moving image, digital camera 100 records the moving image data while enlarging or reducing cutout area Az with respect to the designated position.

Since the automatic stop is set to OFF as described above, digital camera 100 according to the present exemplary embodiment keeps on recording the moving image in cutout area Az even after the magnification for enlarging or reducing cutout area Az reaches the predetermined value. When the user again presses release button 211, digital camera 100 ends the recording of the cutout moving image.

According to the zoom cutout with designated center, the effects described below can be obtained. For example, when a night scene is captured, a shutter speed is likely to become slow. Therefore, when a zooming operation is performed with optical system 110, a moving image which is radially blurred around the center of the zooming is generated. On the other hand, digital camera 100 according to the present disclosure does not have to perform the zooming operation using optical system 110, whereby the generation of a blurred moving image is prevented. Further, according to the zoom cutout with designated center, the user can generate a moving image, which is precisely zoomed with respect to a designated point, without requiring special equipment or special skills. When a zooming operation is performed only with an optical lens without the movement of a digital camera, only a zooming operation toward the center of an image is performed. However, with the zoom cutout with designated center, the user can record a moving image to which a zooming operation with respect to an arbitrary point is performed.

Note that, zooming is performed toward an area designated by a user in the zoom cutout with designated center. However, the present disclosure is not limited thereto.

In the zoom cutout with designated center, the user designates center Pc for enlargement or reduction of cutout area Az (zoom center Pc of an object). However, a zoom cutout pattern in which center Pc for enlargement or reduction of cutout area Az is previously set by digital camera 100 may be employed. Examples of such a cutout pattern which may be employed include a center zoom cutout in which center Pc for enlargement or reduction of cutout area Az is set to the center of 4K moving image area A0 in the horizontal direction, a left zoom cutout in which center Pc is set to the left from the center, and a right zoom cutout in which center Pc is set to the right from the center. Further, a face recognition zoom cutout pattern may be set in which a face or the like of a person in a 4K moving image is recognized, and a cutout area is enlarged or reduced by using the detected face as zoom center Pc.

In the zoom cutout with designated center, an AF area (autofocus area) may be fixed to center Pc for enlargement or reduction of cutout area Az (zoom center Pc of an object) from the start to the end of the zoom cutout with designated center. Alternatively, it may be configured such that a face in cutout area Az is recognizable, and when a face is recognized in cutout area Az during the zoom cutout with designated center, an AF area (autofocus area) is set on the face. With this, digital camera 100 can keep on focusing on a central part of an image or a face to which a line of sight of a user is likely to be directed.

3-3. Panning/Tilting Cutout with Designated Starting Point/Ending Point

Figure 8B:
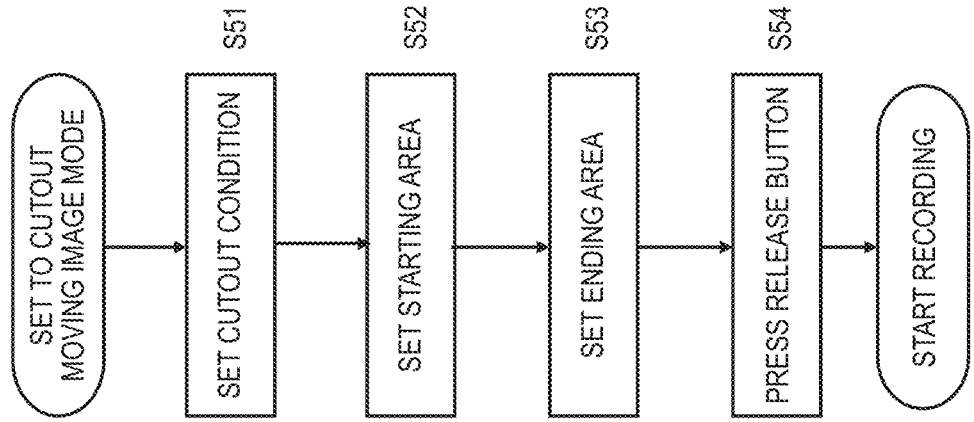
FIG. 8B is a flowchart for describing one example of the panning/tilting cutout with designated starting point/ending point.
Figure 8A:
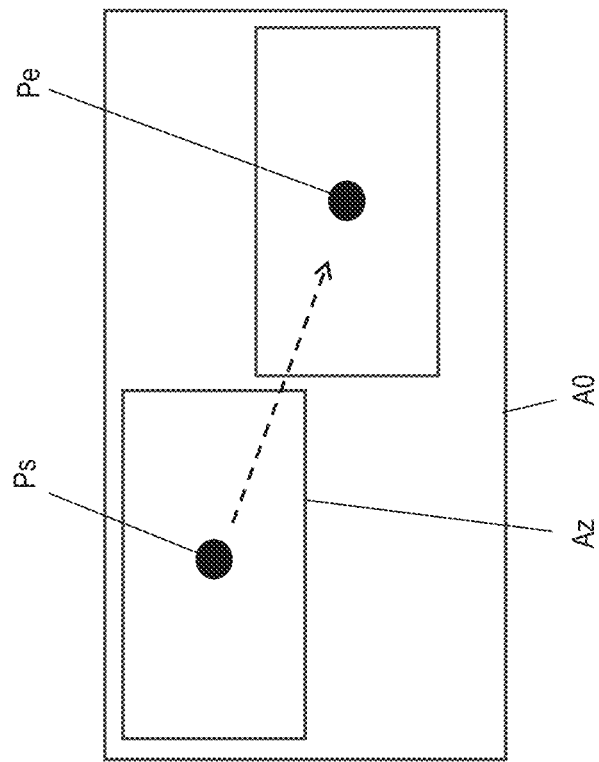
FIG. 8A is a diagram for describing one example of a panning/tilting cutout with designated starting point/ending point.

FIG. 8A is a diagram for describing one example of a panning/tilting cutout with designated starting point/ending point. FIG. 8B is a diagram for describing one example of an operation procedure in performing the panning/tilting cutout with designated starting point/ending point. The panning/tilting cutout with designated starting point/ending point is such that, during capturing of a moving image, a cutout moving image (2K moving image) is generated, while cutout area Az is linearly moved from starting point Ps to ending point Pe which are designated by a user.

Starting point Ps and ending point Pe of the movement of cutout area Az can be set to arbitrary positions in 4K moving image area A0 except for the later-described area. Controller 180 linearly moves cutout area Az from the position of starting point Ps to the position of ending point Pe in the state where the center of cutout area Az is located on a straight line formed by connecting starting point Ps and ending point Pe.

When the panning/tilting cutout with designated starting point/ending point is performed, the user operates the operation system such as center button 213 or cross button 214 to issue various instructions to digital camera 100. As illustrated in FIG. 8B, digital camera 100 executes various settings and controls according to the instructions from the user. This will specifically be described below.

Firstly, the user designates a cutout condition in the cutout moving image mode. The user selects the panning/tilting cutout with designated starting point/ending point mode as an effect from the cutout conditions. The cutout condition can be set on the screen illustrated in FIG. 4B. Note that a moving speed is previously designated in the present exemplary embodiment. Further, the automatic stop is assumed to be set to OFF. Digital camera 100 sets the cutout condition designated by the user (step S51).

Then, the user designates the position of cutout area Az upon starting the panning/tilting cutout with designated starting point/ending point. That is, the user designates a cutout starting area. Specifically, the user can set the center (starting point Ps) of the starting area by touching an arbitrary position on display monitor 220. Digital camera 100 sets a recording start position based on the position of the center (starting point Ps) of the starting area designated by the user (step S52).

Then, the user designates the position of cutout area Az upon ending the panning/tilting cutout with designated starting point/ending point. That is, the user designates a cutout ending area. Specifically, the user can set the center (ending point Pe) of the ending area by touching an arbitrary position on display monitor 220. Digital camera 100 sets a recording end position based on the position of the center (ending point Pe) of the ending area designated by the user (step S53).

After the above-mentioned settings are completed, digital camera 100 is brought into a state capable of recording the cutout moving image with the panning/tilting cutout with designated starting point/ending point. When the user presses release button 211 in this state (step S54), digital camera 100 starts to record the cutout moving image. During the recording of the cutout moving image, digital camera 100 records the moving image data while linearly moving cutout area Az from starting point Ps to ending point Pe at designated speed.

Since the automatic stop is set to OFF as described above, digital camera 100 according to the present exemplary embodiment keeps on recording the moving image in cutout area Az even after cutout area Az moves to the end position of the movement. When the user again presses release button 211, digital camera 100 ends the recording of the cutout moving image.

According to the panning/tilting cutout with designated starting point/ending point, the effects described below can be obtained. For example, when a night scene is captured, a shutter speed is likely to become slow. Therefore, when a user actually pans or tilts a digital camera, a blurred image is generated. On the other hand, in the panning/tilting cutout with designated starting point/ending point of digital camera 100 according to the present disclosure, the user does not have to actually pan or tilt digital camera 100, whereby the generation of a blurred image is prevented. Further, according to the panning/tilting cutout with designated starting point/ending point, the user can generate a moving image, which is precisely panned and/or tilted, without requiring special equipment or special skills.

In performing the panning/tilting cutout with designated starting point/ending point, the user may perform only the panning cutout or tilting cutout by designating a starting point and an ending point. In this case, the user can select only the panning cutout or the tilting cutout as the panning/tilting cutout with designated starting point/ending point, when performing setting on the setting screen illustrated in FIG. 4B. For example, it is assumed that the user selects the panning cutout as the panning/tilting cutout with designated starting point/ending point. In this case, when the user selects a starting point or an ending point, the user may designate a point shifted from the horizontal direction. In order to prevent the occurrence of the shift described above, controller 180 may be configured to automatically cause a starting point or an ending point to coincide with the horizontal direction when the panning cutout is selected as the panning/tilting cutout with designated starting point/ending point. Alternatively, controller 180 may be configured such that, when the user selects a starting point, an ending point is only selectable from positions horizontal to the starting point. In the case where the user selects the tilting cutout as the panning/tilting cutout with designated starting point/ending point, controller 180 performs a similar process in the vertical direction.

3-4. Cutout with Designated Movement Path

Figure 9A:
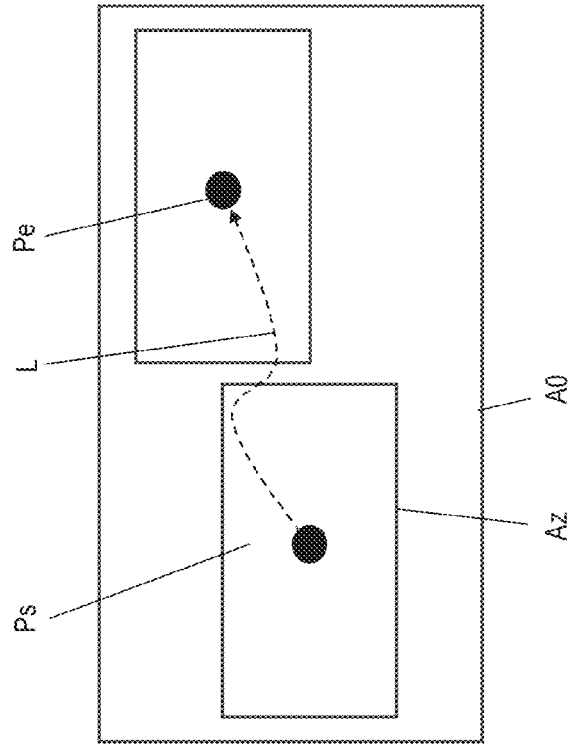
FIG. 9A is a diagram for describing one example of a cutout with designated movement path.
Figure 9B:
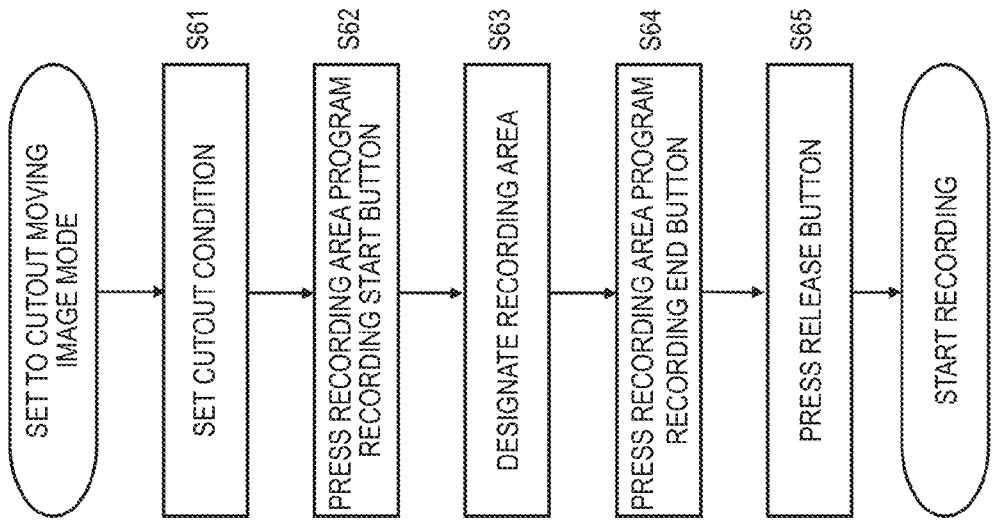
FIG. 9B is a flowchart for describing one example of the cutout with designated movement path.

FIG. 9A is a diagram for describing one example of a cutout with designated movement path. FIG. 9B is a diagram illustrating an example of an operation procedure in performing the cutout with designated movement path. The cutout with designated movement path is such that, during capturing of a moving image, a cutout moving image (2K moving image) is generated, while cutout area Az is moved in a 4K moving image area.

Movement path L can be arbitrarily set in an area in 4K moving image area A0 except for the later-described area. The moving speed of cutout area Az and the manner of changing the moving speed may be set as in the panning cutout or the like.

In the cutout with designated movement path in a cutout moving image mode, controller 180 generates a cutout moving image (2K moving image), while moving cutout area Az in 4K moving image area A0 along movement path L set by a user from its starting point Ps to its ending point Pe. In this case, controller 180 moves cutout area Az with the center of cutout area Az being located on movement path L.

When the cutout with designated movement path is performed, the user operates the operation system such as center button 213 or cross button 214 to issue various instructions to digital camera 100. As illustrated in FIG. 9B, digital camera 100 executes various settings and controls according to the instructions from the user. This will specifically be described below.

Firstly, the user designates a cutout condition in the cutout moving image mode. The user selects the cutout with designated movement path mode as an effect from the cutout conditions. The cutout condition can be set on the screen illustrated in FIG. 4B. Note that a moving speed is previously designated in the present exemplary embodiment. Further, the automatic stop is assumed to be set to OFF. Digital camera 100 sets the cutout condition designated by the user (step S61).

Then, the user presses a recording area program recording start button (step S62). The recording area program recording start button may be configured such that center button 213 and cross button 214 are assigned to this button, or other buttons are assigned to this button. Alternatively, recording area program recording start button may be configured by a touch-button displayed on display monitor 220.

Then, the user designates a recording area. Specifically, the user designates a movement path of cutout area Az. More specifically, the user can set the movement path of cutout area Az by dragging an arbitrary position on display monitor 220. Digital camera 100 sets the recording position based on the movement path of cutout area Az designated by the user (step S63).

Then, the user presses a recording area program recording end button (step S64). The recording area program recording end button can be configured similarly to the recording area program recording start button.

After the above-mentioned settings are completed, digital camera 100 is brought into a state capable of recording the cutout moving image with the cutout with designated movement path. When the user presses release button 211 in this state (step S65), digital camera 100 starts to record the cutout moving image. During the recording of the cutout moving image, digital camera 100 records the moving image data while moving cutout area Az based on the designated movement path.

Since the automatic stop is set to OFF as described above, digital camera 100 according to the present exemplary embodiment keeps on recording the moving image in cutout area Az even after cutout area Az moves to the end position of the movement. When the user again presses release button 211, digital camera 100 ends the recording of the cutout moving image.

According to the cutout with designated movement path, the effects described below can be obtained. For example, when a night scene is captured, a shutter speed is likely to become slow. Therefore, when a user actually moves a digital camera, a blurred image is generated. On the other hand, in the cutout with designated movement path of digital camera 100 according to the present disclosure, the user does not have to actually move digital camera 100, whereby the generation of a blurred image is prevented. Further, according to the cutout with designated movement path, the user can generate a moving image, of which recording area is precisely moved, without requiring special equipment or special skills.

3-5. Object Tracking Cutout

FIG. 10A is a diagram for describing one example of an object tracking cutout. FIG. 10B is a diagram illustrating an example of an operation procedure in performing the object tracking cutout. The object tracking cutout is such that, during capturing of a moving image, an object designated by a user in 4K moving image area A0 is tracked and a position of the object is detected, and a cutout moving image (2K moving image) is generated, while cutout area Az is moved in 4K moving image area A0 according to the detected position of the object.

A known tracking method such as a method of tracking based on a color of an object can be used for the method of tracking an object in an image.

When the object tracking cutout is performed, the user operates the operation system such as center button 213 or cross button 214 to issue various instructions to digital camera 100. As illustrated in FIG. 10B, digital camera 100 executes various settings and controls according to the instructions from the user. This will specifically be described below.

Firstly, the user designates a cutout condition in the cutout moving image mode. The user selects the object tracking cutout mode as an effect from the cutout conditions. The cutout condition can be set on the screen illustrated in FIG. 4B. Further, the automatic stop is assumed to be set to OFF. Digital camera 100 sets the cutout condition designated by the user (step S71).

When the object tracking cutout mode is selected by the user, controller 180 sets an object tracking function to ON (step S72).

Then, the user designates an object to be tracked (step S73). Specifically, the user can designate an object to be tracked by touching arbitrary position Px on display monitor 220.

After the above-mentioned settings are completed, digital camera 100 is brought into a state capable of recording the cutout moving image with the object tracking cutout. When the user presses release button 211 in this state (step S74), digital camera 100 starts to record the cutout moving image. During the recording of the cutout moving image, digital camera 100 records the moving image data while moving cutout area Az along movement path T of the object to be tracked.

When the user again presses release button 211, digital camera 100 ends the recording of the cutout moving image.

According to the object tracking cutout, only an area where an object is present can automatically be cut out and captured from a moving image captured in a wide angle. Thus, the user can capture an active moving image in which an object is captured without moving digital camera 100 according to the object.

3-6. 1-Point AF Designation Area Cutout

FIG. 11A is a diagram for describing one example of a 1-point AF designation area cutout. FIG. 11B is a diagram for describing one example of an operation procedure of the 1-point AF designation area cutout. The 1-point AF designation area cutout is such that, during capturing of a moving image, cutout area Az is set based on an AF area designated by 1-point AF designation in 4K moving image area A0, and moving image data in cutout area Az in 4K moving image area A0 is cut out to generate a cutout moving image (2K moving image). The 1-point AF designation area means a focusing area selected in the 4K moving image area. The size of the focusing area can be changed by operating center button 213, cross button 214, and the like.

When the 1-point AF designation area cutout is performed, the user operates the operation system such as center button 213 or cross button 214 to issue various instructions to digital camera 100. As illustrated in FIG. 11B, digital camera 100 executes various settings and controls according to the instructions from the user. This will specifically be described below.

Firstly, the user designates a cutout condition in the 1-point AF designation area cutout. The user selects the 1-point AF designation area cutout mode as an effect from the capturing conditions. The cutout condition can be set on the screen illustrated in FIG. 4B. Further, the automatic stop is assumed to be set to OFF. Digital camera 100 sets the cutout condition designated by the user (step S81).

After the above-mentioned settings are completed, digital camera 100 is brought into a state capable of recording the cutout moving image with the 1-point AF designation area cutout. When the user presses release button 211 in this state (step S82), digital camera 100 starts to record the cutout moving image.

Then, the user designates a recording area, that is, cutout area Az, in performing the 1-point AF designation area cutout (step S83). Specifically, the user can set a recording area by touching an arbitrary AF point on display monitor 220. During the recording of the cutout moving image, digital camera 100 records the moving image data by using the designated recording area (AF point) as cutout area Az.

When the user again presses release button 211 (step S84), digital camera 100 ends the recording of the cutout moving image.

3-7. Restriction in Setting Cutout Center Position

FIG. 12 is a diagram for describing restriction in setting a cutout center position. Cutout area Az has a predetermined range. Therefore, depending on the cutout center position designated by a user, the range of cutout area Az with the designated position as the center may be outside the range of 4K moving image area A0, and therefore, an image desired by the user may not be obtained. In order to prevent such a situation, frame Sa indicating the range of the settable position of cutout center Po in 4K moving image area A0 may be displayed in the present exemplary embodiment. Frame Sa is set such that, as long as cutout center Po is set within this range, cutout area Az is present in 4K moving image area A0. When the user designates a position outside frame Sa, controller 180 displays a warning and the like. Alternatively, when the user designates a position outside frame Sa, controller 180 does not set the designated position as a cutout center, but may set the position in frame Sa closest to the designated position as a center.

3-8. Face Detection Panning/Tilting Cutout

Figure 13B:
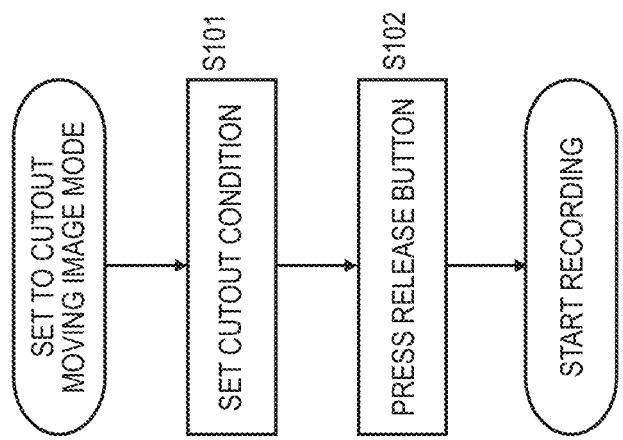
FIG. 13B is a flowchart for describing one example of the face detection panning/tilting cutout.
Figure 13A:
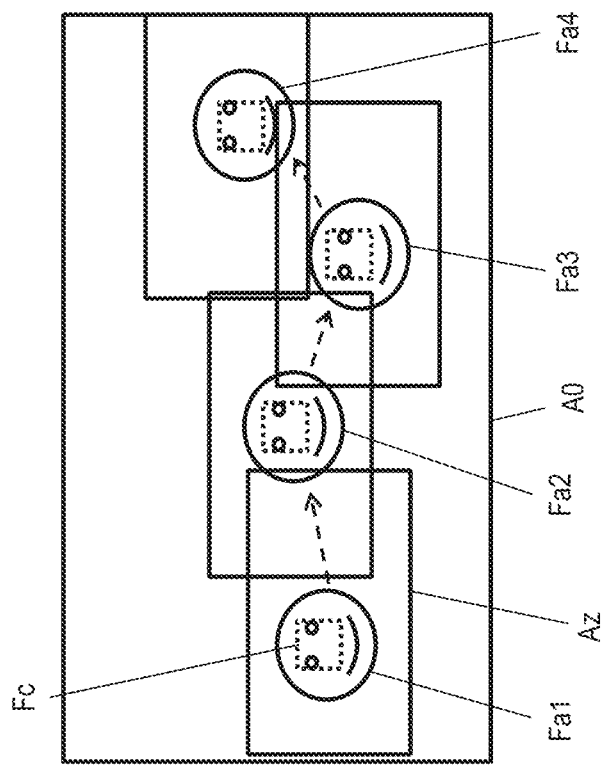
FIG. 13A is a diagram for describing one example of a face detection panning/tilting cutout.

FIG. 13A is a diagram for describing one example of a face detection panning/tilting cutout. FIG. 13B is a diagram for describing one example of an operation procedure in performing the face detection panning/tilting cutout. The face detection panning/tilting cutout is such that, during capturing of a moving image, a face present in 4K moving image area A0 is detected, and when a plurality of faces (for example, Fa1, Fa2, Fa3, and Fa4) are detected, a cutout moving image (2K moving image) is generated while cutout area Az is sequentially moved to the position of each face (Fa1, Fa2, Fa3, and Fa4). Note that, after cutout area Az is moved to the positions of all detected faces, cutout area Az may be enlarged to the size of 4K moving image area A0.

The position of cutout area Az is set such that the detected face is located on substantially the center of cutout area Az, for example. The moving direction of cutout area Az can be set from right to left or from left to right. FIG. 13A illustrates a case where the moving direction is from left to right.

When the face detection panning/tilting cutout is performed, the user operates the operation system such as center button 213 or cross button 214 to issue various instructions to digital camera 100. As illustrated in FIG. 13B, digital camera 100 executes various settings and controls according to the instructions from the user. This will specifically be described below.

Firstly, the user designates a cutout condition in the cutout moving image mode. The user selects the face detection panning/tilting cutout mode as an effect from the cutout conditions. The cutout condition can be set on the screen illustrated in FIG. 4B. Note that a moving speed is previously designated in the present exemplary embodiment. Further, the automatic stop is assumed to be set to OFF. Digital camera 100 sets the cutout condition designated by the user (S101).

After the above-mentioned settings are completed, digital camera 100 is brought into a state capable of recording the cutout moving image with the face detection panning/tilting cutout. When the user presses release button 211 in this state (step S102), digital camera 100 starts to record the cutout moving image. During the recording of the cutout moving image, digital camera 100 records the moving image data while moving cutout area Az in the designated direction at designated speed.

Since the automatic stop is set to OFF as described above, digital camera 100 according to the present exemplary embodiment keeps on recording the moving image in cutout area Az even after cutout area Az moves to the last face position. When the user again presses release button 211, digital camera 100 ends the recording of the cutout moving image.

Note that, in the face detection panning/tilting cutout, an AF area (autofocus area) is set on a face present in cutout area Az, for example. In the case where faces Fa1, Fa2, Fa3, and Fa4 of four persons are detected in 4K moving image area A0 as illustrated in FIG. 13A, cutout area Az is sequentially moved to the positions of face Fa1, face Fa2, face Fa3, and face Fa4 from the left, and AF area (autofocus area) Fc is sequentially moved to the faces present in cutout area Az. Accordingly, a face present in cutout area Az can be appropriately focused, while cutout area Az is moved.

According to the face detection panning/tilting cutout, when a plurality of faces are present in 4K moving image area A0, an image in which each face is sequentially enlarged can automatically be generated.

3-9. Face Detection Zoom Cutout

FIG. 14A is a diagram for describing one example of a face detection zoom cutout. The operation procedure for performing the face detection zoom cutout is illustrated in the flowchart in FIG. 13B described previously. The face detection zoom cutout is such that, during capturing of a moving image, a face present in 4K moving image area A0 is detected, and when a plurality of faces (for example, Fa1, Fa2, Fa3, and Fa4) are detected, a cutout moving image (2K moving image) is generated, while cutout area Az is reduced with all of the plurality of faces (Fa1, Fa2, Fa3, Fa4) being included in cutout area Az.

When the face detection zoom cutout is performed, the user operates the operation system such as center button 213 or cross button 214 to issue various instructions to digital camera 100. As illustrated in FIG. 13B, digital camera 100 executes various settings and controls according to the instructions from the user. This will specifically be described below.

Firstly, the user designates a cutout condition in the cutout moving image mode. The user selects the face detection zoom cutout mode as an effect from the cutout conditions. The cutout condition can be set on the screen illustrated in FIG. 4B. Note that a zooming speed is assumed to be previously set. Further, the automatic stop is assumed to be set to OFF. Digital camera 100 sets the cutout condition designated by the user (step S101).

After the above-mentioned settings are completed, digital camera 100 is brought into a state capable of recording the cutout moving image with the face detection zoom cutout. When the user presses release button 211 in this state (step S102), digital camera 100 starts to record the cutout moving image. Specifically, digital camera 100 detects a face present in 4K moving image area A0, and records cutout moving image (2K moving image) data, while reducing the size of cutout area Az from the size of the entire 4K moving image area A0 to a size smaller than the entire area and including all of the detected faces Fa1, Fa2, Fa3, and Fa4. The reduction is performed at a previously set speed.

Since the automatic stop is set to OFF as described above, digital camera 100 according to the present exemplary embodiment keeps on recording the moving image in cutout area Az even after the size and position of cutout area Az are reduced to the range that can include all of the detected faces. When the user again presses release button 211, digital camera 100 ends the recording of the cutout moving image.

Note that, in the face detection zoom cutout, for example, an AF area (autofocus area) is set on a face present at the position closest to the center of cutout area Az. For example, as illustrated in FIG. 14A, when faces of four persons are detected in 4K moving image area A0, an AF area (autofocus area) is set on face Fa2 present at the position closest to the center in cutout area Az, and the zooming is performed with this AF state being maintained. In the case where a plurality of faces are present as illustrated in FIG. 14A, it can be considered that persons are gathered for taking a group photo. In such a case, there is often little difference in distance between the image-capturing device and these faces. Therefore, even if an AF area is set on face Fa2 present at the position closest to the center of cutout area Az, all of the faces present in cutout area Az can be appropriately focused.

FIG. 14B is a diagram illustrating one example of an operation of setting a size of cutout area Az in zooming with the face detection zoom cutout by digital camera 100.

Firstly, when release button 211 is pressed, digital camera 100 detects all faces in 4K moving image area A0 (step S111).

Digital camera 100 determines the position of the upper side of cutout area Az such that the uppermost face out of the detected faces is included in cutout area Az (step S112). For example, digital camera 100 sets the position of the upper side of cutout area Az at the position upwardly away from the upper end of the uppermost face by a predetermined distance. The predetermined distance is a predetermined number of pixels in a digital image, for example.

Digital camera 100 determines the position of the lower side of cutout area Az such that the lowermost face out of the detected faces is included in cutout area Az (step S113). For example, digital camera 100 sets the position of the lower side of cutout area Az at the position downwardly away from the lower end of the lowermost face by a predetermined distance.

Digital camera 100 determines the position of the left side of cutout area Az such that the leftmost face out of the detected faces is included in cutout area Az (step S114). For example, digital camera 100 sets the position of the left side of cutout area Az at the position away from the left end of the leftmost face to the left by a predetermined distance.

Digital camera 100 determines the position of the right side of cutout area Az such that the rightmost face out of the detected faces is included in cutout area Az (step S115). For example, digital camera 100 sets the position of the right side of cutout area Az at the position away from the right end of the rightmost face to the right by a predetermined distance. When cutout area Az is set as described above, an aspect ratio of a generated cutout moving image may be different from the aspect ratio of the 2K moving image (moving image having 1920×1080 pixels). In such a case, either the positions of the upper side and the lower side or the positions of the left side and the right side may be changed to cause the aspect ratio to coincide with the aspect ratio of the 2K moving image.

Digital camera 100 selects face Fa2 present at the position in cutout area Az closest to the center of cutout area Az out of the detected faces as a target to be focused, and AF area (autofocus area) Fc is set (step S116).

As described above, according to the face detection zoom cutout, 2K moving image data can be generated, while cutout area Az is continuously enlarged with all the faces included in 4K moving image area A0 being included.

3-10. Tracking Method Automatic Switching Cutout

FIGS. 15A to 15C are diagrams for describing one example of a tracking method automatic switching cutout. The operation procedure for performing the tracking method automatic switching cutout is illustrated in the flowchart in FIG. 13B described previously. The tracking method automatic switching cutout is such that, when a touch operation or drag operation is performed on display monitor 220 during capturing of a cutout moving image, an object present on the touched position is tracked and cutout area Az is moved by following the object, and when a touch operation is not performed, automatic tracking is performed and cutout area Az is moved following the automatic tracking, to generate a cutout moving image (2K moving image). AF area (autofocus area) Fc is set on the object that is being tracked.

When the tracking method automatic switching cutout is performed, the user operates the operation system such as center button 213 or cross button 214 to issue various instructions to digital camera 100. As illustrated in FIG. 13B described previously, digital camera 100 executes various settings and controls according to the instructions from the user. This will specifically be described below.

Firstly, the user designates a cutout condition in the cutout moving image mode. The user selects the tracking method automatic switching cutout mode as an effect from the cutout conditions. The cutout condition can be set on the screen illustrated in FIG. 4B. Note that the automatic stop is assumed to be set to OFF. Digital camera 100 sets the cutout condition designated by the user (step S121).

After the above-mentioned settings are completed, digital camera 100 is brought into a state capable of recording the cutout moving image with the tracking method automatic switching cutout. When the user presses release button 211 in this state (step S122), digital camera 100 starts to record the cutout moving image when the user performs a touch operation.

Digital camera 100 determines whether the user performs the touch operation or not (step S123).

When the user performs the touch operation (Yes in step S123), digital camera 100 determines whether the touched state is continued at the same position or a drag operation is performed (S124).

When the touched state is continued or a drag operation is performed (Yes in step S124), digital camera 100 executes manual object tracking (step S125). Specifically, digital camera 100 sets (moves) cutout area Az so as to cause the position touched by the user to coincide with the center of cutout area Az, and set an AF area (autofocus area) on the touched position, thereby recording a cutout moving image. The size of cutout area Az is set beforehand.

When the touched state is not continued and a drag operation is not performed (No in step S124), digital camera 100 executes automatic object tracking (step S126). Specifically, digital camera 100 (controller 180) sets an object tracking function to ON, moves cutout area Az such that the object to be tracked is located at the center of cutout area Az, and sets an AF area (autofocus area) at the position, thereby recording a cutout moving image. The size of cutout area Az is set beforehand.

Since the automatic stop is set to OFF as described above, digital camera 100 according to the present exemplary embodiment keeps on recording the cutout moving image at the last position even after cutout area Az moves to the last face position. When the user again presses release button 211, digital camera 100 ends the recording of the cutout moving image.

Figure 16B:
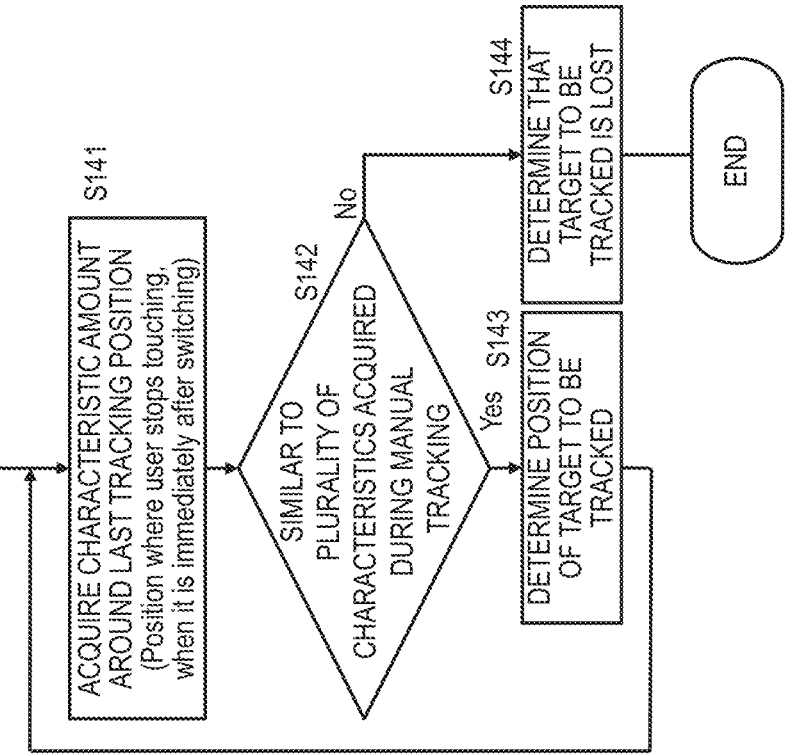
FIG. 16B is a flowchart for describing how a controller learns during execution of automatic tracking.
Figure 16A:
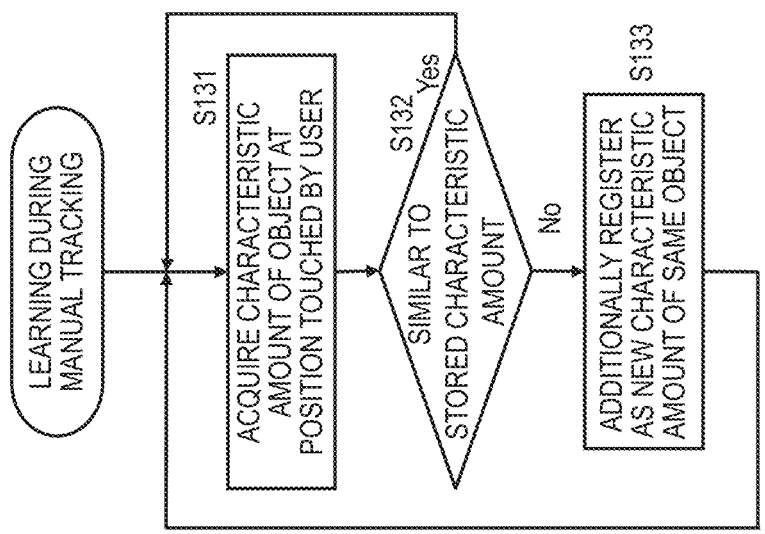
FIG. 16A is a flowchart for describing how a controller learns during execution of manual tracking.

Next, learning of tracking in the tracking method automatic switching mode will be described. FIG. 16A is a diagram for describing how the controller learns during the execution of manual tracking. FIG. 16B is a diagram for describing how the controller learns during the execution of automatic tracking.

Firstly, learning during the execution of manual tracking will be described with reference to FIG. 16A. Controller 180 acquires a characteristic amount of an object at a position touched by a user on display monitor 220 (step S131).

Controller 180 determines whether or not the characteristic involved with the characteristic amount acquired this time is similar to the characteristic involved with a stored characteristic amount (step S132).

When the characteristics are not similar (NO in step S132), controller 180 additionally registers the characteristic amount acquired this time as a new characteristic amount of the same object (step S133).

On the other hand, when the characteristics are similar to each other (YES in step S132), controller 180 returns to the process in previous step S131.

Next, learning during the execution of automatic tracking will be described with reference to FIG. 16B.

Controller 180 acquires a characteristic amount around the last tracking position (the position where the user stops touching on display monitor 220, when it is immediately after switching) (step S141).

Controller 180 determines whether or not the characteristic involved with the characteristic amount acquired this time is similar to the characteristic involved with a characteristic amount which has been acquired in manual tracking and stored, based on each of the characteristics (step S142).

When the characteristics are not similar (NO in step S142), controller 180 determines that the object to be tracked is lost (step S144). That is, the learning during the automatic tracking is ended.

On the other hand, when the characteristics are similar to each other (YES in step S142), controller 180 determines (acquires) the position of the object to be tracked (step S143).

According to the process in the flowchart in FIG. 16A, a new characteristic amount of the same object can be acquired during the manual tracking, whereby tracking precision during the automatic tracking according to the process in the flowchart in FIG. 16B can be enhanced.

FIG. 17 is a diagram for describing how the automatic tracking is switched to the manual tracking by the user's touch operation on display monitor 220, when the object to be tracked is lost as described above during the automatic tracking.

FIG. 17 illustrates an example in which the object to be tracked is lost during the execution of the automatic tracking. In this example, cutout area Az is located at the position indicated by Pa. However, object Ob is not present in cutout area Az, but is present at the position indicated by Pb. In this case, when the user touches the object part on display monitor 220, the mode is switched to the manual tracking mode. At that time, cutout area Az is not moved instantaneously from position Pa to position Pb, but is moved at a predetermined speed. When cutout area Az is instantaneously moved, a user who sees a recorded image may have a feeling of strangeness. Note that, the predetermined speed may preliminarily be set to a gentle speed that does not give the user a feeling of strangeness. The movement of cutout area Az at the predetermined speed as described above can prevent the user from having a feeling of strangeness.

According to the tracking method automatic switching cutout, an object can be tracked by a manual operation according to a user's intention, in addition to the effect described in 3-5. Object tracking cutout. Further, the tracking precision during the automatic tracking can be enhanced by causing the controller to learn the characteristic amount of the object during the manual tracking.

3-11. Object-Size-Change Following Tracking Cutout

FIG. 18 is a diagram for describing one example of an object-size-change following tracking cutout. The object-size-change following tracking cutout is such that, in the previously described 3-5. Object tracking cutout, the position and size of cutout area Az are changed according to the position and size of object Ob which is being tracked in 4K moving image area A0. Note that, the control operation similar to the control operation described in 3-5. Object tracking cutout is performed, except that the size of cutout area Az is changed according to the change in the size of object Ob. Therefore, the different point will mainly be described below.

In the present mode, the size of object Ob in 4K moving image area A0 (for example, the number of pixels in the horizontal direction and vertical direction) is detected while the object is tracked. Then, the size and position of cutout area Az are set such that frame Fr of cutout area Az is away from the upper end, the lower end, the left end, and the right end of detected object Ob by at least a predetermined number of pixels. The size of object Ob may be detected with a known technique.

According to the object-size-change following tracking cutout, only an area where object Ob is present can automatically be cut out and captured from a moving image captured in a wide angle. Thus, the user can capture an active moving image in which object Ob is captured without moving digital camera 100 according to object Ob. Particularly, according to the object-size-change following tracking cutout, when object Ob becomes close to digital camera 100 and moves in the direction in which object Ob is enlarged in 4K moving image area A0 as illustrated in FIG. 18, for example, the size of cutout area Az can automatically be changed following the size of object Ob. Therefore, even if the size of object Ob is changed in 4K moving image area A0, the entire object Ob can be captured, and the size of object Ob in the generated cutout moving image can be kept substantially constant. On the contrary, even when object Ob is away from digital camera 100 and moves in the direction in which the size of object Ob is reduced in 4K moving image area A0, the entire object Ob can be captured, and the size of object Ob in the generated cutout moving image can automatically be kept substantially constant.

3-12. Pause of Movement, Enlargement, and Reduction of Cutout Area

While an image is recorded with a cutout mode, the recording of the image of cutout area Az may be continued with the movement, enlargement, and reduction of cutout area Az being paused by an operation on center button 213 and cross button 214 or other buttons. In this case, it may be configured such that the movement, enlargement, and reduction of cutout area Az can be restarted by an operation on center button 213 and cross button 214 or other buttons, for example. Thus, while the recording of the image of cutout area Az is continued, the movement, enlargement, and reduction of cutout area Az may be stopped as appropriate based on the user's intention.

4. Effects

Digital camera 100 (image-capturing device) according to the present disclosure includes CCD 140, ADC 150, and image processor 160 (image-capturing unit) that captures a moving image to generate 4K moving image data (first moving image data); and controller 180 (controller) that generates cutout moving image data (second moving image data) based on cutout area Az obtained by cutting out a part of entire area A0 of a moving image indicated by 4K moving image data, and records the generated cutout moving image data on memory card 200 (recording medium). Controller 180 changes the position and/or the size of cutout area Az according to a predetermined instruction of a user and records the resultant image data on memory card 200.

Accordingly, cutout moving image data of cutout area Az out of the entire area of an image indicated by the generated 4K moving image data is generated, and the generated cutout moving image data is recorded on memory card 200. In this case, the cutout moving image data is recorded on memory card 200 by changing the position and/or the size of cutout area Az according to a predetermined instruction of a user. Accordingly, an image similar to an image obtained by panning or tilting digital camera 100 can be obtained.

Consequently, data of a moving image such as a pan image or a tilt image can be obtained without requiring specialized equipment.

In the present disclosure, controller 180 generates cutout moving image data while moving cutout area Az that is to be cut out.

Thus, the user can acquire moving image data similar to moving image data obtained by actually panning or tilting digital camera 100, without actually panning or tilting digital camera 100.

In the case where digital camera 100 is moved, that is, panned or tilted, without using specialized equipment or the like, a captured image is blurred, and thus, quality of the captured image is likely to be deteriorated. However, in digital camera 100 according to the present disclosure, it is unnecessary to move digital camera 100, whereby the occurrence of the problem described above is prevented.

For example, when a night scene is captured, a shutter speed is likely to become slow. Therefore, when a user actually pans or tilts a digital camera to obtain a pan image or a tilt image, a blurred image is generated. On the other hand, according to digital camera 100 according to the present disclosure, the user does not have to actually pan or tilt digital camera 100, whereby the generation of a blurred image is prevented.

In the present disclosure, digital camera 100 further includes operation member 210 (input unit) that accepts an instruction concerning a movement of cutout area Az. The instruction concerning a movement of cutout area Az includes an instruction concerning at least one of a starting point of the movement, an ending point of the movement, a moving direction, a moving speed, a manner of changing the moving speed, and a movement path.

Accordingly, the conditions for moving cutout area Az can be set in detail. Thus, digital camera 100 can flexibly meet the demand of a user for a cutout moving image.

In the present disclosure, digital camera 100 further includes an operation member 210 that accepts an instruction to pause the movement of cutout area Az. When operation member 210 accepts the instruction to pause, controller 180 stops the movement of cutout area Az, and continues the generation and recording of cutout moving image data.

Accordingly, the generation and recording of the cutout moving image data can be continued, in the case where the movement of cutout area Az is stopped. Thus, the user can stop the movement of the cutout area as appropriate based on the user's intention, while continuing the recording of the image of cutout area Az.

In the present disclosure, controller 180 generates cutout moving image data while changing a size of cutout area Az that is to be cut out.

Accordingly, moving image data similar to moving image data obtained by performing a zooming operation to an optical system of digital camera 100 can be acquired without performing a zooming operation to the optical system of digital camera 100.

In addition, when a night scene is captured, for example, a shutter speed is likely to become slow. Therefore, when a zooming operation is performed with optical system 110, an image which is radially blurred around the center of the zooming is generated. On the other hand, digital camera 100 according to the present disclosure does not have to perform the zooming operation using optical system 110, whereby the generation of a blurred moving image is prevented.

In the present disclosure, digital camera 100 further includes operation member 210 (input unit) that accepts an instruction concerning zooming. The instruction concerning zooming includes an instruction concerning at least a center point for enlargement or reduction of cutout area Az, a speed of enlarging or reducing cutout area Az, and a manner of changing the speed of enlarging or reducing cutout area Az.

Accordingly, the conditions for zooming cutout area Az can be set in detail. Thus, digital camera 100 can flexibly meet the demand of a user for a cutout moving image.

In the present disclosure, digital camera 100 further includes an operation member 210 (second input unit) that accepts an instruction to pause an enlargement or reduction of cutout area Az. When operation member 210 accepts the instruction to pause, controller 180 stops the enlargement or reduction of cutout area Az, and continues the generation and recording of cutout moving image data.

Accordingly, the generation and recording of the cutout moving image data can be continued, in the case where the enlargement or reduction of cutout area Az is stopped. Thus, the user can stop the enlargement or reduction of cutout area Az as appropriate based on the user's intention, while continuing the recording of the image of cutout area Az.

In the present disclosure, controller 180 detects a position of an object based on 4K moving image data, and moves cutout area Az such that the object is present in cutout area Az based on the detected position.

Accordingly, the user can acquire image data similar to image data obtained by moving digital camera 100 for tracking the object, without moving digital camera 100 for tracking the object.

When digital camera 100 is moved for tracking an object, digital camera 100 cannot follow the movement of the object, so that the object may be lost from an image or a camera shake may occur during the movement of digital camera 100. As a result, quality of the captured image is likely to be deteriorated. The problems described above can be solved by the present disclosure.

In the present disclosure, controller 180 changes a size of cutout area Az according to a size of an object on a moving image indicated by 4K moving image data.

Accordingly, the size of the object on the generated cutout moving image (2K moving image) can be made substantially constant.

In the present disclosure, digital camera 100 further includes display monitor 220 (display unit, input unit) that can display the entire area of a moving image that is currently captured, and that accepts designation of a displayed object. Controller 180 has a manual tracking mode for moving cutout area Az based on the position designated on display monitor 220 and an automatic tracking mode for detecting the position of an object based on 4K moving image data and moving cutout area Az such that the object is present in cutout area Az based on the detected position.

Accordingly, the user can acquire image data similar to image data obtained by moving digital camera 100 for tracking the object, without moving digital camera 100 for tracking the object. Particularly, tracking can be performed manually or automatically according to the present disclosure.

In the present disclosure, in the case where the designation of the object on display monitor 220 is no longer performed when the manual tracking mode is set, controller 180 switches to the automatic tracking mode.

Thus, this configuration enables digital camera 100 to manually track an object, and then, automatically track the object in a continuous way.

In the present disclosure, when the manual tracking mode is set, controller 180 acquires a characteristic amount of an object at the position designated on display monitor 220, and when the automatic tracking mode is set, controller 180 performs a tracking control using the characteristic amount acquired when the manual tracking mode is set.

Accordingly, the automatic tracking can be performed with high precision using the characteristic amount acquired during the manual tracking mode.

In the present disclosure, when a plurality of faces are detected as an object, controller 180 sequentially moves cutout area Az to the position of each face.

Accordingly, the user can acquire cutout moving image data in which a plurality of faces are sequentially enlarged as in the case of moving digital camera 100, without moving digital camera 100, that is, without tilting digital camera 100 or performing a zooming operation to an optical system of digital camera 100.

In the present disclosure, when a plurality of faces are detected as an object, controller 180 generates cutout moving image data, while reducing cutout area Az with all of the plurality of faces being included in cutout area Az.

Accordingly, the user can acquire cutout moving image data which includes all of the faces included in a 4K moving image and in which these faces are sequentially enlarged, without tilting digital camera 100 or performing a zooming operation to an optical system of digital camera 100.

In the present disclosure, controller 180 causes optical system 110 to automatically focus on an object present in cutout area Az, during capturing.

Accordingly, digital camera 100 can automatically focus on an object present in cutout area Az during capturing. Conventionally, a photographer generally performs appropriate focusing, while panning or tilting a digital camera. However, since multiple operations have to be simultaneously performed, it is necessary to perform capturing by a plurality of photographers.

In the present disclosure, controller 180 automatically adjusts an exposure amount based on brightness of an object present in cutout area Az during capturing.

Accordingly, an exposure amount can appropriately be adjusted according to an object present in cutout area Az.

In the present disclosure, controller 180 restricts designation of a position of cutout area Az such that the whole of cutout area Az falls within a range of an entire area of a moving image indicated by 4K moving image data.

This configuration prevents the designation of the position of cutout area Az such that cutout area Az does not fall within the range of the entire area of the moving image indicated by the 4K moving image data.

In the present disclosure, digital camera 100 further includes display monitor 220 that can display the entire area of 4K moving image that is currently captured. During capturing, controller 180 displays frame Fr, which indicates a perimeter of cutout area Az, as being superimposed on the 4K moving image indicated by the 4K moving image data.

Accordingly, the user can easily recognize the position and range of cutout area Az in entire area A0 of the 4K moving image that is currently captured.

In the present disclosure, 4K moving image data is constituted by frame image data having 3840 horizontal pixels and 2160 vertical pixels. Cutout moving image data is constituted by frame image data having 1920 horizontal pixels and 1080 vertical pixels.

According to this configuration, a moving image, a so-called 2K moving image, obtained by cutting out cutout area Az from a 4K moving image and having 1920 horizontal pixels and 1080 vertical pixels can be captured with digital camera 100 that can capture a moving image, a so-called 4K moving image, having 3840 horizontal pixels and 2160 vertical pixels.

Other Exemplary Embodiments

The first exemplary embodiment has described the case where the recording medium is memory card 200. However, the recording medium is not limited thereto. The recording medium may be internal memory 240 in digital camera 100.

The first exemplary embodiment has described the case where a 2K moving image having about 2000×1000 pixels is cut out from a 4K moving image having 4000×2000 pixels. However, the present disclosure is not limited thereto. A 4K moving image or a 2K moving image may be cut out based on a 8K moving image having 8000×4000 pixels. Specifically, it is only necessary that the number of pixels of a moving image which is to be cut out is smaller than the number of pixels of the moving image before being cut out.

In the cutout moving image described in the first exemplary embodiment, an effect for the movement of the focus point or the like may be designated in addition to the designation of the effect for the cutout frame. For example, the cutout frame may be moved in the horizontal direction by a panning operation, while a specific object may be continuously focused on without the shift of the focus point. According to this configuration, a range of video expression is extended, and a moving image that is further demanded by a user can be recorded.

The exemplary embodiments have been described above as illustrative examples of the technique in the present disclosure. For this purpose, the accompanying drawings and the detailed description have been provided. Therefore, the constituent elements described in the accompanying drawings and the detailed description may include not only constituent elements essential for solving the problems but also constituent elements non-essential for solving the problems, in order to illustrate the technique described above. Thus, these non-essential constituent elements should not be readily recognized as being essential, due to these non-essential constituent elements being described in the accompanying drawings and the detailed description. Furthermore, since the exemplary embodiments described above are intended to illustrate the technique in the present disclosure, various changes, substitutions, additions, omissions, and the like can be made within the scope of the claims and the scope of equivalents thereof.

INDUSTRIAL APPLICABILITY

The present invention is applicable to devices other than a digital camera. For example, the present invention is applicable to a device that can capture an image, such as a digital movie camera or a camera-equipped cellular phone.

REFERENCE MARKS IN THE DRAWINGS 100 digital camera
110 optical system
120 lens driver
130 shutter
140 CCD
150 ADC
160 image processor
170 buffer
180 controller 190 card slot
200 memory card
210 operation member
211 release button
212 zoom lever
213 center button
214 cross button
220 display monitor
240 internal memory
300 diaphragm

What is claimed is:

1. An image-capturing device comprising:
an image-capturing unit that captures a moving image and generates first moving image data;
a controller that generates second moving image data based on a cutout area obtained by cutting out a part of an entire area of a moving image indicated by the first moving image data and records the generated second moving image data on a recording medium as a cutout moving image; and
an input unit that accepts an instruction concerning the cutout area including a moving speed of the cutout area,
wherein the controller generates the second moving image data while changing at least one of a position and a size of the cutout area according to the instruction concerning the cutout area and records the second moving image data on the recording medium as the cutout moving image,
wherein the moving speed of the cutout area is selected from a plurality of moving speed.

2. The image-capturing device according to claim 1, wherein the instruction concerning the movement of the cutout area includes an instruction concerning at least one of a starting point of the movement, an ending point of the movement, a moving direction, a manner of changing the moving speed, and a movement path.

3. The image-capturing device according to claim 1, further comprising a second input unit that accepts an instruction to pause a movement of the cutout area,
wherein the controller stops the movement of the cutout area, and continues the generation and recording of the second moving image data, when the second input unit accepts the instruction to pause.

4. The image-capturing device according to claim 1, wherein the controller generates the second moving image data while changing the size of the cutout area.

5. The image-capturing device according to claim 4, further comprising an input unit that accepts an instruction concerning zooming,
wherein the instruction concerning zooming includes an instruction concerning at least one of a center point for enlargement or reduction of the cutout area, a direction of the enlargement or the reduction of the cutout area, a speed for the enlargement or the reduction of the cutout area, and a manner of changing the speed for the enlargement or the reduction of the cutout area.

6. The image-capturing device according to claim 4, further comprising a second input unit that accepts an instruction to pause zooming,
wherein, when the second input unit accepts the instruction to pause, the controller stops the enlargement or the reduction of the cutout area, and continues the generation and recording of the second moving image data.

7. The image-capturing device according to claim 1, wherein the controller detects a position of an object from the first moving image data, and moves the cutout based on the detected position of the object area such that the object is present in the cutout area.

8. The image-capturing device according to claim 7, wherein the controller changes the size of the cutout area according to a size of the object in the moving image indicated by the first moving image data.

9. An image-capturing device comprising:
an image-capturing unit that captures a moving image and generates first moving image data;
a controller that generates second moving image data based on a cutout area obtained by cutting out a part of an entire area of a moving image indicated by the first moving image data and records the generated second moving image data on a recording medium as a cutout moving image;
an input unit that accepts an instruction concerning the cutout area including a moving speed of the cutout area,
wherein the controller generates the second moving image data while changing at least one of a position and a size of the cutout area according to the instruction concerning the cutout area and records the second moving image data on the recording medium as the cutout moving image;
a display unit capable of displaying an entire area of a moving image that is currently being captured; and
an input unit that accepts designation of an object displayed on the display unit,
wherein the controller includes:
a manual tracking mode for moving the cutout area based on a position of the object designated by the input unit; and
an automatic tracking mode for detecting an object from the first moving image data, and moving the cutout area based on the detected position of the object such that the object is present in the cutout area.

10. The image-capturing device according to claim 9, wherein
in a case where the designation of the object by the input unit is no longer performed when the manual tracking mode is set, the controller switches to the automatic tracking mode.

11. The image-capturing device according to claim 10, wherein
when the manual tracking mode is set, the controller acquires a characteristic amount of the object designated by the input unit, and
when the automatic tracking mode is set, the controller performs a tracking control using the characteristic amount acquired when the manual tracking mode is set.

12. The image-capturing device according to claim 1, wherein
the controller detects a face as an object from the first moving image data, and
in a case where a plurality of the faces are detected, the controller generates the second moving image data while sequentially moving the cutout area to a position of each of the faces.

13. The image-capturing device according to claim 1, wherein
the controller detects a face as an object from the first moving image data, and
in a case where a plurality of the faces are detected, the controller generates the second moving image data while reducing the cutout area with all of the faces included in the cutout area.

14. The image-capturing device according to claim 1, wherein, during capturing, the controller causes an optical system to automatically focus on an object present in the cutout area.

15. The image-capturing device according to claim 1, wherein, during capturing, the controller automatically adjusts an exposure amount based on brightness of an object present in the cutout area.

16. The image-capturing device according to claim 2, wherein the controller restricts designation of the position of the cutout area such that a whole of the cutout area falls within a range of the entire area of the moving image indicated by the first moving image data.

17. The image-capturing device according to claim 5, wherein the controller restricts designation of the position of the cutout area such that a whole of the cutout area falls within a range of the entire area of the moving image indicated by the first moving image data.

18. An image-capturing device comprising:
   an image-capturing unit that captures a moving image and generates first moving image data;
   a controller that generates second moving image data based on a cutout area obtained by cutting out a part of an entire area of a moving image indicated by the first moving image data and records the generated second moving image data on a recording medium as a cutout moving image;
   an input unit that accepts an instruction concerning the cutout area including a moving speed of the cutout area,
   wherein the controller generates the second moving image data while changing at least one of a position and a size of the cutout area according to the instruction concerning the cutout area and records the second moving image data on the recording medium as the cutout moving image; and
   a display unit capable of displaying an entire area of a moving image that is currently being captured,
   wherein, during capturing, the controller displays a frame, which indicates a perimeter of the cutout area, on the display unit by superimposing the frame on the moving image indicated by the first moving image data.

19. The image-capturing device according to claim 1, wherein
   the first moving image data is constituted by frame image data having 3840 horizontal pixels and 2160 vertical pixels, and
   the second moving image data is constituted by frame image data having 1920 horizontal pixels and 1080 vertical pixels.

* * * * *